US011234236B2

(12) United States Patent
Liu et al.

(10) Patent No.: US 11,234,236 B2
(45) Date of Patent: *Jan. 25, 2022

(54) COMMUNICATION METHOD AND COMMUNICATIONS APPARATUS

(71) Applicant: HUAWEI TECHNOLOGIES CO., LTD., Guangdong (CN)

(72) Inventors: Deping Liu, Beijing (CN); Zhenwei Lu, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/897,854

(22) Filed: Jun. 10, 2020

(65) Prior Publication Data

US 2020/0305156 A1    Sep. 24, 2020

Related U.S. Application Data

(63) Continuation of application No. 16/046,663, filed on Jul. 26, 2018, now Pat. No. 10,701,687, which is a
(Continued)

(30) Foreign Application Priority Data

Jan. 27, 2016  (WO) ................ PCT/CN2016/072410

(51) Int. Cl.
*H04W 72/04*      (2009.01)
*H04W 72/02*      (2009.01)
(Continued)

(52) U.S. Cl.
CPC ......... *H04W 72/0446* (2013.01); *H04W 4/70* (2018.02); *H04W 72/02* (2013.01);
(Continued)

(58) Field of Classification Search
CPC ....... H04W 4/46; H04W 8/005; H04W 72/02; H04W 72/04; H04W 72/0446; H04W 76/14; H04W 88/02; H04W 92/18
See application file for complete search history.

(56) References Cited

U.S. PATENT DOCUMENTS 8,005,091 B2   8/2011   Wu et al.
9,736,874 B2   8/2017   Sartori et al.
(Continued)

FOREIGN PATENT DOCUMENTS

CN   104136932 A   11/2014
CN   104160726 A   11/2014
(Continued)

OTHER PUBLICATIONS

Office Action issued in Indian Application No. 201847028791 dated Nov. 10, 2020, 7 pages.
(Continued)

*Primary Examiner* — Eric Nowlin
(74) *Attorney, Agent, or Firm* — Fish & Richardson P.C.

(57) ABSTRACT

The present disclosure relates to communication methods and communications apparatus. In one example communication method, a first terminal determines a start time unit of a resource period, and transmits communication data in the resource period, where communication data is transmitted in the start time unit and the communication data is retransmitted in another time unit of the resource period. Then the first terminal sends transmission sequence number indication information and time domain transmission resource indication information to a second terminal that performs direct communication with the first terminal.

12 Claims, 19 Drawing Sheets

Related U.S. Application Data continuation of application No. PCT/CN2016/100876, filed on Sep. 29, 2016.

(51) Int. Cl.
*H04W 4/70* (2018.01)
*H04W 72/12* (2009.01)
*H04W 4/44* (2018.01)
*H04W 4/46* (2018.01)
*H04W 8/00* (2009.01)
*H04W 88/02* (2009.01)

(52) U.S. Cl.
CPC ............ *H04W 4/44* (2018.02); *H04W 4/46* (2018.02); *H04W 8/005* (2013.01); *H04W 72/12* (2013.01); *H04W 88/02* (2013.01)

(56) References Cited

U.S. PATENT DOCUMENTS

| | | | |
|---|---|---|---|
| 9,781,556 | B2 | 10/2017 | Johnsson et al. |
| 9,801,199 | B2 * | 10/2017 | Wu .................. H04W 8/005 |
| 9,918,254 | B2 | 3/2018 | Chinthalapudi et al. |
| 9,936,482 | B2 | 4/2018 | Jung et al. |
| 9,942,917 | B2 | 4/2018 | Faurie et al. |
| 9,949,246 | B2 | 4/2018 | Li et al. |
| 9,967,850 | B2 | 5/2018 | Jung et al. |
| 10,051,611 | B2 | 8/2018 | Li et al. |
| 10,064,212 | B2 | 8/2018 | Faurie et al. |
| 10,123,359 | B2 | 11/2018 | Jung et al. |
| 10,231,244 | B2 | 3/2019 | Wang et al. |
| 10,375,746 | B2 * | 8/2019 | Kim .................. H04W 72/1278 |
| 10,383,034 | B2 | 8/2019 | Agiwal et al. |
| 10,390,319 | B2 | 8/2019 | Kalhan |
| 10,396,970 | B2 | 8/2019 | Hui et al. |
| 10,477,620 | B2 | 11/2019 | Xiong et al. |
| 10,512,062 | B2 | 12/2019 | Lee et al. |
| 10,542,583 | B1 | 1/2020 | Pan et al. |
| 10,555,143 | B2 | 2/2020 | Uchiyama |
| 10,932,280 | B2 * | 2/2021 | Wang .................. H04W 72/12 |
| 10,993,251 | B2 * | 4/2021 | Li .................. H04W 72/1284 |
| 2009/0019168 | A1 | 1/2009 | Wu et al. |
| 2013/0223352 | A1 | 8/2013 | Sartori et al. |
| 2013/0223353 | A1 | 8/2013 | Liu et al. |
| 2014/0328329 | A1 | 11/2014 | Novlan et al. |
| 2014/0335853 | A1 | 11/2014 | Sartori et al. |
| 2014/0342747 | A1 | 11/2014 | Lee et al. |
| 2015/0016354 | A1 | 1/2015 | Yie et al. |
| 2015/0016356 | A1 | 1/2015 | Yie et al. |
| 2015/0016357 | A1 | 1/2015 | Yie et al. |
| 2015/0271818 | A1 * | 9/2015 | Tavildar ............ H04W 72/0446 375/138 |
| 2015/0319724 | A1 | 11/2015 | Chae et al. |
| 2015/0327315 | A1 | 11/2015 | Xue et al. |
| 2016/0044704 | A1 | 2/2016 | Li et al. |
| 2016/0174188 | A1 | 6/2016 | Kim et al. |
| 2016/0198510 | A1 | 7/2016 | Perets et al. |
| 2016/0249344 | A1 * | 8/2016 | Schlienz ............ H04W 72/0413 |
| 2016/0262061 | A1 | 9/2016 | Chinthalapudi et al. |
| 2016/0295624 | A1 * | 10/2016 | Novlan .................. H04W 72/04 |
| 2016/0338094 | A1 | 11/2016 | Faurie et al. |
| 2016/0338095 | A1 | 11/2016 | Faurie et al. |
| 2017/0013576 | A1 | 1/2017 | Jung et al. |
| 2017/0013595 | A1 | 1/2017 | Jung et al. |
| 2017/0013648 | A1 | 1/2017 | Jung et al. |
| 2017/0019910 | A1 * | 1/2017 | Seo .................. H04W 76/10 |
| 2017/0027013 | A1 | 1/2017 | Kim et al. |
| 2017/0048822 | A1 | 2/2017 | Lee et al. |
| 2017/0055311 | A1 | 2/2017 | Van Phan et al. |
| 2017/0215199 | A1 * | 7/2017 | Wu .................. H04L 5/0012 |
| 2017/0223711 | A1 | 8/2017 | Wang et al. |
| 2017/0230996 | A1 * | 8/2017 | Li .................. H04W 72/1294 |
| 2017/0295554 | A1 | 10/2017 | Lee et al. |
| 2018/0006796 | A1 | 1/2018 | Hui et al. |
| 2018/0132202 | A1 | 5/2018 | Kalhan |
| 2018/0152234 | A1 | 5/2018 | Huang et al. |
| 2018/0152915 | A1 | 5/2018 | Kalhan |
| 2018/0152920 | A1 | 5/2018 | Zhao |
| 2018/0176973 | A1 * | 6/2018 | Kim .................. H04L 5/0051 |
| 2018/0213379 | A1 | 7/2018 | Xiong et al. |
| 2018/0213577 | A1 | 7/2018 | Burbidge et al. |
| 2018/0227943 | A1 | 8/2018 | Xiao et al. |
| 2018/0288588 | A1 | 10/2018 | Uchiyama |
| 2018/0310321 | A1 | 10/2018 | Mallick et al. |
| 2018/0317239 | A1 * | 11/2018 | Wang .................. H04W 72/12 |
| 2018/0332585 | A1 | 11/2018 | Faurie et al. |
| 2018/0359620 | A1 | 12/2018 | Zhao |
| 2019/0082490 | A1 | 3/2019 | Zhang et al. |
| 2019/0141678 | A1 | 5/2019 | Yang |
| 2019/0182840 | A1 * | 6/2019 | Feng .................. H04W 74/0816 |
| 2019/0239186 | A1 | 8/2019 | Tugnawat et al. |
| 2019/0289627 | A1 | 9/2019 | Blasco Serrano et al. |
| 2019/0342804 | A1 | 11/2019 | Futaki et al. |
| 2019/0342859 | A1 | 11/2019 | Rubin et al. |
| 2019/0372647 | A1 | 12/2019 | Su et al. |
| 2019/0373520 | A1 | 12/2019 | Sillanpää |
| 2020/0008266 | A1 | 1/2020 | Pan et al. |
| 2021/0144730 | A1 * | 5/2021 | Wang .................. H04W 72/12 |
| 2021/0219324 | A1 * | 7/2021 | Li .................. H04W 72/1284 |

FOREIGN PATENT DOCUMENTS

| | | |
|---|---|---|
| CN | 104936166 A | 9/2015 |
| CN | 105101429 A | 11/2015 |
| EP | 2117243 A1 | 11/2009 |
| WO | WO2015115945 A1 | 8/2015 |
| WO | WO2015152629 A1 | 10/2015 |
| WO | WO2018027822 A1 | 2/2018 |

OTHER PUBLICATIONS

3GPP TS 36.212 V13.0.0 (Dec. 2015),3rd Generation Partnership Project;Technical Specification Group Radio Access Network,Evolved Universal Terrestrial Radio Access (E-UTRA);Multiplexing and channel coding(Release 13),total 121 pages.

3GPP TS 36.213 V13.0.0 (Dec. 2015),3rd Generation Partnership Project;Technical Specification Group Radio Access Network,Evolved Universal Terrestrial Radio Access (E-UTRA); Physical layer procedures(Release 13),dated 2015, total 326 pages.

3GPP TS 36.321 V13.0.0 (Dec. 2015),3rd Generation Partnership Project;Technical Specification Group Radio Access Network;Evolved Universal Terrestrial Radio Access (E-UTRA); Medium Access Control (MAC) protocol specification Release 13),dated 2012,total 82 pages.

International Search Report and Written Opinion issued in International Application No. PCT/CN2016/072410 dated Oct. 21, 2016, 11 pages.

International Search Report and Written Opinion issued in International Application No. PCT/CN2016/100876 dated Dec. 23, 2016, 21 pages.

R2-157186 Samsung et al.,"Introducing eSL",3GPP TSG-RAN2 Meeting #92,Anaheim (CA), USA, Nov. 16-20, 2015,total 68 pages.

* cited by examiner

COMMUNICATION METHOD AND COMMUNICATIONS APPARATUS

CROSS-REFERENCE TO RELATED APPLICATIONS

This application is a continuation of U.S. patent application Ser. No. 16/046,663, filed on Jul. 26, 2018, which is a continuation of International Application No. PCT/CN2016/100876, filed on Sep. 29, 2016, which claims priority to Patent Application No. PCT/CN2016/072410, filed on Jan. 27, 2016. All of the aforementioned applications are hereby incorporated by reference in their entireties.

TECHNICAL FIELD

The present invention relates to the field of communications technologies, and in particular, to a communication method and a communications apparatus.

BACKGROUND

With development of communications technologies, direct communication such as Device to Device (D2D) communication or vehicle-to-vehicle (V2V) communication can be performed between devices.

In a device-to-device communications technology, a network-side device (for example, a base station) may perform a resource configuration, scheduling, coordination, and the like to assist terminals in performing device-to-device communication. Generally, the network-side device allocates a transmission resource pool to a device-to-device communications terminal, so that the terminal performs device-to-device communication data transmission. The resource pool may be understood as a time domain resource set, and includes a resource pool used for transmission and a resource pool used for reception. The network-side device configures different resource pools in a broadcast mode, for example, a scheduling assignment (SA) resource pool and a data resource pool, and each resource pool has a fixed period. The device-to-device communications terminal may use, in two modes, a time domain resource in a resource pool allocated by the network-side device. In one mode, the device-to-device communications terminal uses a time domain resource that is allocated and determined in the resource pool by the network-side device for every device-to-device communications terminal. In the other mode, the device-to-device communications terminal randomly selects a time domain resource from the resource pool autonomously. The device-to-device communications terminal selects a time domain resource from the resource pool in one of the two modes, and then performs device-to-device communication data transmission according to a fixed period of the resource pool.

When the device-to-device communications terminal performs device-to-device communication data transmission in the foregoing mode, randomness of a data packet generation time is relatively high. When a quantity of terminals is relatively large, the conventional resource pool allocation mode cannot adapt to service features properly, and a case of poor transmission performance occurs.

SUMMARY

Embodiments of the present invention provide a communication method and a communications apparatus to improve transmission performance.

According to a first aspect, a communication method is provided. A first terminal obtains a resource period parameter, where the first terminal may be understood as a sending terminal, the resource period parameter is sent by a network-side device or preconfigured by the first terminal, the resource may be understood as a resource pool, there is at least one resource, the resource period parameter includes a period duration of each of the at least one resource, and the period duration may be understood as a quantity of occupied subframes. The first terminal determines a start time unit of a resource period, where the start time unit of the period may be understood as a start subframe of a period in which the first terminal starts to send communication data, and a data packet sent subsequently by the first terminal is sent periodically based on the start time unit and the resource period parameter.

In this embodiment of the present invention, the first terminal determines the start time unit of the resource period for starting to send the communication data. Therefore, the start time unit of the resource period is random and more flexible, and can adapt to a randomness feature of a data packet generation time of the terminal, and further, communication data transmission performance can be improved, and a latency can be reduced.

Optionally, the first terminal may obtain, from the network-side device according to a priority of the first terminal, a resource period parameter corresponding to the priority, or the first terminal obtains, from the network-side device according to a type of the sent communication data, a resource period parameter corresponding to the communication data type, so that different terminals or a same terminal can use different resource periods in different cases.

In a possible design, when determining the start time unit of the resource period, the first terminal may use different determining manners according to a specific mode of the first terminal. The first terminal may send the communication data in two modes. In one mode, the first terminal sends the communication data by using a time domain resource allocated by the network-side device to the first terminal. In the other mode, the terminal autonomously selects a time domain resource to send the communication data.

The first terminal sends the communication data by using the time domain resource allocated by the network-side device, and the first terminal may determine the start time unit of the resource period in the following two manners:

Manner 1: The first terminal uses a $K^{th}$ sidelink subframe that is after a sidelink subframe corresponding to a subframe in which scheduling information is received, as the start time unit of the resource period; or the first terminal uses a sidelink subframe corresponding to a $K^{th}$ subframe that is after a subframe in which scheduling information is received, as the start time unit of the resource period; where K is a non-negative integer, and the scheduling information is sent by the network-side device.

Manner 2: The first terminal uses a time unit indicated by scheduling information, as the start time unit of the resource period, where the scheduling information is sent by the network-side device.

The first terminal may select, according to an actual situation, one of the foregoing two manners to determine a start time unit of a period of an available resource. In a possible implementation, before the first terminal determines the start time unit of the period, if the network-side device can obtain an offset between a system frame number (SFN) and a direct frame number (DFN), where the offset is obtained and sent by the first terminal to a network side, the manner 2 may be used, and the network-side device indicates, in the sent scheduling information, the start time unit of the period of the resource available to the first terminal. Using the manner 2, the network-side device directly indicates the start time unit of the resource period. This can avoid a fuzzy resource configuration problem.

The first terminal sends the communication data by using the autonomously selected time domain resource, and the first terminal may determine the start time unit of the resource period in the following manner:

The first terminal uses a start subframe for sending a transport block at a higher layer, as the start time unit of the resource period.

In another possible design, a period duration in a resource period parameter for a resource may also be changed. For example, the first terminal sends period parameter adjustment instruction information. The network-side device receives the period parameter adjustment instruction information sent by the first terminal, adjusts the resource period parameter according to the period parameter adjustment instruction information, and sends a resource period parameter obtained after adjustment. The first terminal may send the data according to the resource period parameter obtained after adjustment.

In still another possible design, the first terminal sends transmission sequence number indication information and time domain transmission resource indication information to a second terminal, or sends period start point indication information and time domain transmission resource indication information to a second terminal, so that the second terminal obtains a time domain resource position of the communication data that the first terminal transmits every time in the used resource period.

The transmission sequence number indication information is used to indicate a transmission sequence number of the sent communication data in the resource period; the period start point indication information is used to indicate the start time unit of the resource period; and the time domain transmission resource indication information is used to indicate the time domain resource position that is occupied every time to send the communication data in the resource period, and that is relative to the start time unit of the resource period.

In yet another possible design, the first terminal sends resource period indication information to the second terminal, and the second terminal receives the resource period indication information sent by the first terminal, so that the second terminal can receive the communication data according to the resource period indicated by the first terminal and determine the time domain resource position occupied by the communication data.

According to a second aspect, a communication method is provided. In this method, a second terminal obtains transmission sequence number indication information and time domain transmission resource indication information sent by a first terminal, or obtains period start point indication information and time domain transmission resource indication information sent by a first terminal; and the second terminal determines, according to the transmission sequence number indication information and the time domain transmission resource indication information, a time domain resource position of communication data that the first terminal sends every time in the resource period in time domain transmission.

The second terminal may be understood as a receiving terminal, and the first terminal may be understood as a sending terminal. The transmission sequence number indication information is used to indicate a transmission sequence number of the sent communication data in the resource period; the period start point indication information is used to indicate a start time unit of the resource period; and the time domain transmission resource indication information is used to indicate the time domain resource position that is occupied every time to send the communication data in the resource period, and that is relative to the start time unit of the resource period.

According to a third aspect, a communication method is provided. In this method, a network-side device determines a resource period parameter, where the resource period parameter may be the resource period parameter in the communication method in the first aspect; and the network-side device sends the resource period parameter.

In a possible design, the network-side device sends scheduling information, where the scheduling information includes a start time unit of a resource period. This can avoid a fuzzy resource configuration problem.

In another possible design, the network-side device receives period parameter adjustment instruction information sent by a first terminal, adjusts the resource period parameter according to the period parameter adjustment instruction information, and sends a resource period parameter obtained after adjustment, so as to adjust a resource period used by the terminal.

According to a fourth aspect, a communication method is provided. In this method, a network-side device sends time unit indication information, where the time unit indication information is used to indicate a correspondence between an air interface time unit and a sidelink time unit. A first terminal receives the time unit indication information, and determines the sidelink time unit according to the time unit indication information. The network-side device may send the time unit indication information in the air interface time unit. The first terminal receives the time unit indication information in the air interface time unit, and determines the sidelink time unit according to the air interface time unit and the time unit indication information.

In the foregoing implementation, the sidelink time unit corresponding to the air interface time unit may be determined accurately according to the correspondence between the air interface time unit and the sidelink time unit.

In a possible design, the time unit indication information indicates one of two sidelink time units that temporally overlap a $K^{th}$ air interface time unit that is after the air interface time unit, where K is a positive integer. The first terminal determines, according to the time unit indication information, one sidelink time unit in the two sidelink time units that temporally overlap the $K^{th}$ air interface time unit that is after the air interface time unit, as the sidelink time unit.

The time unit indication information may indicate a sidelink time unit in any one of the following manners: indicating one sidelink time unit whose sequence number is an odd number (or an even number) and that is of the two sidelink time units; indicating one sidelink time unit whose sequence number is smaller (or greater) and that is of the two sidelink time units: indicating one sidelink time unit whose time is earlier (or later) and that is of the two sidelink time units; or indicating one sidelink time unit whose sequence number is an odd number (or an even number) and that is of the two sidelink time units corresponding to an air interface time unit whose sequence number is an odd number or (an even number).

In another possible design, the time unit indication information indicates a time unit sequence number in a frame on a sidelink. The first terminal uses a sidelink time unit corresponding to the time unit sequence number on the sidelink as the sidelink time unit. A time of the sidelink time unit corresponding to the time unit sequence number is later than that of the air interface time unit.

Sequence numbers of all time units in the frame on the sidelink may be indicated by using values of the bits representing the time unit indication information, so as to indicate all the time units in the frame. Alternatively, sequence numbers of some time units in the frame on the sidelink may be indicated by using values of bits representing the time unit indication information, so as to save bits.

In still another possible design, a difference between an air interface time unit sequence number and a sidelink time unit sequence number is indicated by using the time unit indication information; and the terminal device determines a sidelink time unit according to the difference.

In still another possible design, the time unit indication information indicates at least one of at least one sidelink time unit indicated by time unit scheduling correspondence information. The time unit scheduling correspondence information is used to indicate at least one sidelink time unit corresponding to the air interface time unit. The first terminal determines, according to the air interface time unit and the time unit scheduling information, the at least one sidelink time unit corresponding to the air interface time unit, and uses the at least one sidelink time unit that is indicated by the time unit indication information, and that is of the at least one sidelink time unit corresponding to the air interface time unit, as the sidelink time unit.

The time unit scheduling correspondence information may be predefined in a system or configured by the network-side device. When configured by the network-side device, the time unit scheduling correspondence information may be transmitted by using at least one of system information or dedicated RRC signaling.

In still another possible design, the time unit indication information is used to indicate a sidelink time unit corresponding to a $K^{th}$ air interface time unit that is after the air interface time unit in which the time unit indication information is received, where K is a positive integer. The first terminal uses the sidelink time unit corresponding to the $K^{th}$ air interface time unit that is after the air interface time unit, as a sidelink time unit for sending communication data.

In still another possible design, to enable the network-side device to better schedule resources on the sidelink, the first terminal may report a relative relationship between the air interface time unit and the sidelink time unit; and the network-side device may determine, according to the relative relationship between the air interface time unit and the sidelink time unit that is reported by the first terminal, the correspondence between the air interface time unit and the sidelink time unit that is indicated by the time unit indication information.

In still another possible design, an implicit rule used to indicate the correspondence between the air interface time unit and the sidelink time unit may be preconfigured between the network-side device and the first terminal. When the network-side device and the first terminal determine a $K^{th}$ time unit that is after an $n^{th}$ time unit in which the network-side device sends scheduling information on an air interface, a sidelink time unit corresponding to the $K^{th}$ time unit that is after the $n^{th}$ time unit in which the network-side device sends the scheduling information on the air interface may be determined according to the preconfigured implicit rule. The first terminal determines, according to the implicit rule, the specific sidelink time unit corresponding to the $K^{th}$ time unit that is after the $n^{th}$ time unit on the air interface, and uses the determined sidelink time unit as a start time unit of a resource period.

According to a fifth aspect, a communications apparatus is provided. The communications apparatus is applied to a sending terminal, and has a function for implementing the first terminal in the foregoing method design. The function may be implemented by hardware, or may be implemented by corresponding software executed by hardware. The hardware or software includes one or more modules corresponding to the foregoing function. The module may be software and/or hardware. For example, the communications apparatus includes a receiving unit, a processing unit, and a sending unit. The receiving unit is configured to obtain a resource period parameter, where the resource period parameter is sent by a network-side device or preconfigured by the sending terminal, there is at least one resource, and the resource period parameter includes a period duration of each of the at least one resource. The processing unit is configured to determine a start time unit of a resource period. The sending unit is configured to send communication data according to the start time unit of the resource period determined by the processing unit and the resource period parameter received by the receiving unit.

The communications apparatus determines the start time unit of the resource period for starting to send the communication data. Therefore, the start time unit of the resource period is random and more flexible, and can adapt to a randomness feature of a data packet generation time of the terminal, and further, communication data transmission performance can be improved, and a latency can be reduced.

Optionally, the receiving unit obtains, from the network-side device according to a priority of the sending terminal, a resource period parameter corresponding to the priority; or the receiving unit obtains, from the network-side device according to a type of the sent communication data, a resource period parameter corresponding to the communication data type, so that different terminals or a same terminal can use different resource periods in different cases.

Optionally, the sending terminal sends the communication data by using a time domain resource allocated by the network-side device; and the processing unit may determine the start time unit of the resource period in the following manners:

Manner 1: Use a $K^{th}$ sidelink subframe that is after a sidelink subframe corresponding to a subframe in which scheduling information is received, as the start time unit of the resource period; or use a sidelink subframe corresponding to a $K^{th}$ subframe that is after a subframe in which scheduling information is received, as the start time unit of the resource period; where K is a non-negative integer, and the scheduling information is sent by the network-side device.

Manner 2: Use a time unit indicated by scheduling information, as the start time unit of the resource period, where the scheduling information is sent by the network-side device.

When the processing unit determines the start time unit of the resource period in the manner 2, the receiving unit is further configured to obtain an offset between a system frame number (SFN) and a direct frame number (DFN) before the processing unit determines the start time unit of the resource period.

Using the manner 2, the network-side device directly indicates the start time unit of the resource period. This can avoid a fuzzy resource configuration problem.

Optionally, the sending terminal sends the communication data by using an autonomously selected time domain resource; and the processing unit specifically determines the start time unit of the resource period in the following manner: using a start subframe for sending a transport block at a higher layer, as the start time unit of the resource period.

In a possible design, the sending unit is further configured to send period parameter adjustment instruction information to the network-side device; and the receiving unit is further configured to obtain a resource period parameter obtained by the network-side device after adjustment.

In another possible design, the sending unit is further configured to send transmission sequence number indication information and time domain transmission resource indication information to a receiving terminal that performs direct communication with the sending terminal, or send period start point indication information and time domain transmission resource indication information to a receiving terminal that performs direct communication with the sending terminal, so that the receiving terminal obtains a time domain resource position of the communication data that the sending terminal transmits every time in the used resource period.

The transmission sequence number indication information is used to indicate a transmission sequence number of the sent communication data in the resource period; the period start point indication information is used to indicate the start time unit of the resource period; and the time domain transmission resource indication information is used to indicate the time domain resource position that is occupied every time to send the communication data in the resource period, and that is relative to the start time unit of the resource period.

In yet another possible design, the sending unit is further configured to send resource period indication information to the receiving terminal that performs direct communication with the sending terminal, where the resource period indication information is used to indicate the resource period used by the sending terminal, so that the receiving terminal can receive the communication data according to the resource period indicated by the sending terminal and determine the time domain resource position occupied by the communication data.

Optionally, the receiving unit in the communications apparatus may be a receiver, the processing unit may be a controller or a processor, and the sending unit may be a transmitter.

According to a sixth aspect, a communications apparatus is provided. The communications apparatus is applied to a receiving terminal, and has a function for implementing the second terminal in the foregoing method design. The function may be implemented by hardware, or may be implemented by corresponding software executed by hardware. The hardware or software includes one or more modules corresponding to the foregoing function. The module may be software and/or hardware. For example, the communications apparatus includes a receiving unit and a processing unit. The receiving unit is configured to obtain transmission sequence number indication information and time domain transmission resource indication information sent by a sending terminal that performs device-to-device communication with the receiving terminal, or configured to obtain period start point indication information and time domain transmission resource indication information sent by a sending terminal that performs device-to-device communication with the receiving terminal. The transmission sequence number indication information is used to indicate a transmission sequence number of sent communication data in the resource period, the period start point indication information is used to indicate a start time unit of the resource period, and the time domain transmission resource indication information is used to indicate a time domain resource position that is occupied every time to send the communication data in the resource period, and that is relative to the start time unit of the resource period. The processing unit is configured to determine, according to the transmission sequence number indication information and the time domain transmission resource indication information obtained by the receiving unit, the time domain resource position of the communication data that the sending terminal sends every time in the resource period in time domain transmission.

Optionally, the receiving unit in the communications apparatus may be a receiver, and the processing unit may be a controller or a processor.

According to a seventh aspect, a communications apparatus is provided. The communications apparatus is applied to a network-side device, and has a function for implementing the network-side device in the foregoing method design. The function may be implemented by hardware, or may be implemented by corresponding software executed by hardware. The hardware or software includes one or more modules corresponding to the foregoing function. The module may be software and/or hardware. For example, the communications apparatus includes a processing unit and a sending unit. The processing unit is configured to determine a resource period parameter. The sending unit is configured to send the resource period parameter determined by the processing unit.

In a possible design, the sending unit is further configured to send scheduling information, where the scheduling information includes a start time unit of a resource period. This can avoid a fuzzy resource configuration problem.

In another possible design, the communications apparatus further includes a receiving unit, where
the receiving unit is configured to receive period parameter adjustment instruction information sent by a terminal; the processing unit is further configured to adjust the resource period parameter according to the period parameter adjustment instruction information received by the receiving unit; and the sending unit is further configured to send a resource period parameter obtained after adjustment, so as to adjust a resource period used by the terminal.

Optionally, the receiving unit in the communications apparatus may be a receiver, the processing unit may be a controller or a processor, and the sending unit may be a transmitter.

According to an eighth aspect, a communications apparatus is provided. The communications apparatus has a function for implementing the first terminal in the communication method in the fourth aspect. The function may be implemented by hardware, or may be implemented by corresponding software executed by hardware. The hardware or software includes one or more modules corresponding to the foregoing function. The module may be software and/or hardware.

The communications apparatus may be a sending terminal applied to device-to-device communication.

In a possible design, the communications apparatus includes a receiving unit, a processing unit, and a sending unit. The receiving unit is configured to receive time unit indication information from a network-side device in an air interface time unit, where the time unit indication information is used to indicate a correspondence between an air interface time unit and a sidelink time unit. The processing unit is configured to determine the sidelink time unit according to the air interface time unit and the time unit indication information received by the receiving unit. The sending unit is configured to send communication data in the sidelink time unit determined by the processing unit.

Optionally, the time unit indication information is used to indicate one of two sidelink time units that temporally overlap a K air interface time unit that is after the air interface time unit, where K is a positive integer. The processing unit determines, according to the time unit indication information, one sidelink time unit in the two sidelink time units that temporally overlap the $K^{th}$ air interface time unit that is after the air interface time unit, as the sidelink time unit.

The time unit indication information indicates one of the two sidelink time units in any one of the following manners: indicating one sidelink time unit whose sequence number is an odd number and that is of the two sidelink time units; indicating one sidelink time unit whose sequence number is an even number and that is of the two sidelink time units; indicating one sidelink time unit whose time is earlier and that is of the two sidelink time units; or indicating one sidelink time unit whose time is later and that is of the two sidelink time units.

K is a predefined fixed value, or is a value sent by the network-side device.

Optionally, the time unit indication information is used to indicate a time unit sequence number in a frame on a sidelink; and the processing unit uses a sidelink time unit corresponding to the time unit sequence number on the sidelink as the sidelink time unit; where a time of the sidelink time unit corresponding to the time unit sequence number is later than that of the air interface time unit.

Optionally, the time unit indication information is used to indicate at least one of at least one sidelink time unit indicated by time unit scheduling correspondence information, and the time unit scheduling correspondence information is used to indicate at least one sidelink time unit corresponding to the air interface time unit; and the processing unit determines, according to the air interface time unit and the time unit scheduling information, the at least one sidelink time unit corresponding to the air interface time unit, and uses the at least one sidelink time unit that is indicated by the time unit indication information, and that is of the at least one sidelink time unit corresponding to the air interface time unit, as the sidelink time unit.

The time unit scheduling correspondence information is predefined in a system or configured by the network-side device.

Optionally, the time unit indication information is used to indicate a sidelink time unit corresponding to a $K^{th}$ air interface time unit that is after the air interface time unit in which the time unit indication information is received, where K is a positive integer; and the processing unit uses the air interface time unit corresponding to the $K^{th}$ air interface time unit that is after the air interface time unit, as the sidelink time unit for sending the communication data.

In another possible design, the receiving unit included in the communications apparatus may be a receiver, the processing unit may be a processor, and the sending unit may be a transmitter. The processor is configured to execute the corresponding function of the first terminal in the communication method in the fourth aspect. The receiver is configured to receive the time unit indication information in the air interface time unit, and the transmitter is configured to send the communication data in the sidelink time unit. The communications apparatus may further include a memory. The memory is coupled with the processor. The memory stores a necessary program instruction and data.

According to a ninth aspect, a communications apparatus is provided. The communications apparatus has a function for implementing the network-side device in the communication method in the fourth aspect. The function may be implemented by hardware, or may be implemented by corresponding software executed by hardware. The hardware or software includes one or more modules corresponding to the foregoing function. The module may be software and/or hardware.

The communications apparatus may be a network-side device.

In a possible design, the communications apparatus includes a processing unit and a sending unit. The processing unit is configured to determine time unit indication information. The sending unit is configured to send, in an air interface time unit, the time unit indication information determined by the processing unit to a sending terminal. The time unit indication information is used to indicate a correspondence between an air interface time unit and a sidelink time unit, and the sending terminal determines the sidelink time unit according to the air interface time unit and the time unit indication information.

Optionally, the time unit indication information is used to indicate one of two sidelink time units that temporally overlap a $K^{th}$ air interface time unit that is after the air interface time unit, where K is a positive integer.

Optionally, the time unit indication information indicates one of the two sidelink time units in any one of the following manners: indicating one sidelink time unit whose sequence number is an odd number and that is of the two sidelink time units; indicating one sidelink time unit whose sequence number is an even number and that is of the two sidelink time units; indicating one sidelink time unit whose time is earlier and that is of the two sidelink time units; or indicating one sidelink time unit whose time is later and that is of the two sidelink time units.

K is a predefined fixed value, or is a value sent by the network-side device.

Optionally, the time unit indication information is used to indicate a time unit sequence number in a frame on a sidelink.

Optionally, the time unit indication information is used to indicate at least one of at least one sidelink time unit indicated by time unit scheduling correspondence information, and the time unit scheduling correspondence information is used to indicate at least one sidelink time unit corresponding to the air interface time unit.

Optionally, the time unit scheduling correspondence information is predefined in a system or configured by the network-side device.

Optionally, the time unit indication information is used to indicate a sidelink time unit corresponding to a $K^{th}$ air interface time unit that is after the air interface time unit in which the time unit indication information is received, where K is a positive integer.

In this embodiment of the present invention, the network-side device may send the time unit indication information to the first terminal, where the time unit indication information is used to indicate the correspondence between the air interface time unit and the sidelink time unit, that is, the time unit indication information is used to indicate the specific sidelink time unit corresponding to the air interface time unit; and after receiving the time unit indication information, the first terminal may determine, according to the time unit indication information, the specific sidelink time unit corresponding to the air interface time unit.

DESCRIPTION OF EMBODIMENTS

The following describes in detail the technical solutions in the embodiments of the present invention with reference to the accompanying drawings in the embodiments of the present invention.

Figure 1A:
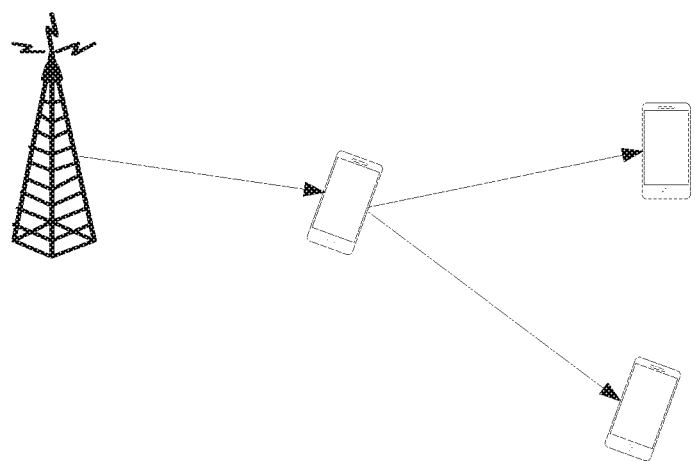
FIG. 1A and FIG. 1B are schematic diagrams of scenarios of direct communication between terminals to which an embodiment of the present invention is applicable.
Figure 1B:
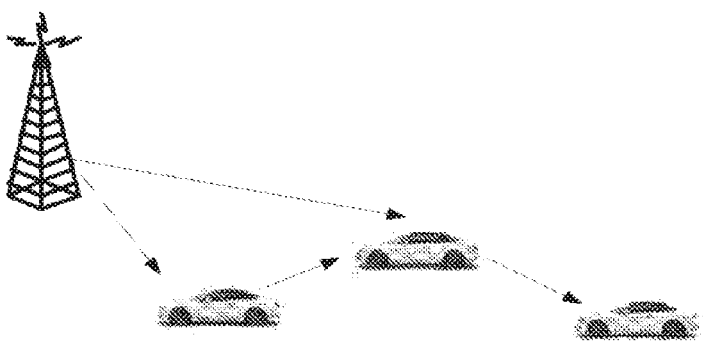

A communication method provided by an embodiment of the present invention may be applied to a communication scenario of direct communication between two devices, for example, a device-to-device (D2D) communication scenario shown in FIG. 1A, or a vehicle-to-vehicle (V2V) communication scenario shown in FIG. 1B, or a vehicle to another node (V2X) communication scenario. In this embodiment of the present invention, devices that perform direct communication may include a handheld device having a wireless communication function, an in-vehicle device, a wearable device, a computing device, or another processing device connected to a wireless modem, and user equipment (UE) in various forms, a mobile station (MS), a terminal, a terminal device (Terminal Equipment), and the like. For ease of description, hereinafter the devices that perform direct communication are referred to as terminals in this application.

For example, in the communication scenarios shown in FIG. 1A and FIG. 1B, terminals may perform communication directly without using a network-side device. A network-side device may perform a resource configuration, scheduling, coordination, and the like to assist the terminals in performing direct communication. In one mode, before transmitting data, a terminal first applies for a transmission resource from a network-side device, and reports status information of the terminal to the network-side device; and the network-side device allocates the corresponding transmission resource to the terminal according to information reported by the terminal. The network-side device in this embodiment of the present invention is an apparatus that is deployed in a radio access network and provides a wireless communication function for the terminal, and may be a base station (BS), for example, may include various forms of macro base stations, micro base stations, relay stations, and access points. In a system using different radio access technologies, a name of a device having a base station function may vary. For example, the device is referred to as an evolved NodeB (eNB or eNodeB for short) in a Long Term Evolution (LTE) network, or referred to as a NodeB in a third-generation 3G network. In another mode, no network-side device assists terminals in performing communication. In this case, a terminal autonomously selects a transmission resource to send information.

An LTE-D2D technology is a technology for direct communication between LTE-based terminals newly defined by the 3rd Generation Partnership Project (3GPP) by using a Rel. 12 protocol. An Internet of Vehicles (LTE-V) technology is obtained through evolution based on D2D, or may be understood as terminal-to-terminal communication. Therefore, the following uses an LTE-D2D system as an example for description. The LTE-D2D technology uses a broadcast mode for data transmission, and includes two features: discovery and communication. Discovery means that a terminal broadcasts information periodically. Communication is direct data transmission between two terminals, and uses a mechanism that combines scheduling assignment (SA) and data. SA is used to indicate status information of data sent by a sending terminal, including time domain resource information and frequency domain resource information of the data, modulation and coding scheme (MCS) information, a frequency hopping indication, timing advance information, a receiving group identity (ID), and the like. A time resource pattern (T-RPT) indicates a time resource occupied by a corresponding data part, that is, subframes in which the data part is transmitted. A receiving terminal can receive service data according to the indication of the SA. Data is service data sent by the sending terminal by using a format indicated by the SA, in a time domain resource position indicated by the SA.

In a D2D communications system, if a terminal is within coverage of a cell, a network-side device allocates a resource pool to the terminal, where the resource pool may be understood as a time-frequency resource set, including a resource pool used for transmission and a resource pool used for reception. A network side configures different resource pools in a broadcast mode, for example, a discovery resource pool, an SA resource pool, and a data resource pool. The resource pool includes a transmitting resource pool and a receiving resource pool. The network-side device configures and broadcasts information about the transmitting resource pool and the receiving resource pool. The terminal transmits or listens to a signal in a corresponding resource pool according to the information about the resource pool broadcast by the network-side device. If the terminal is beyond the coverage of the cell, a preconfigured resource pool may be used.

Figure 2A:
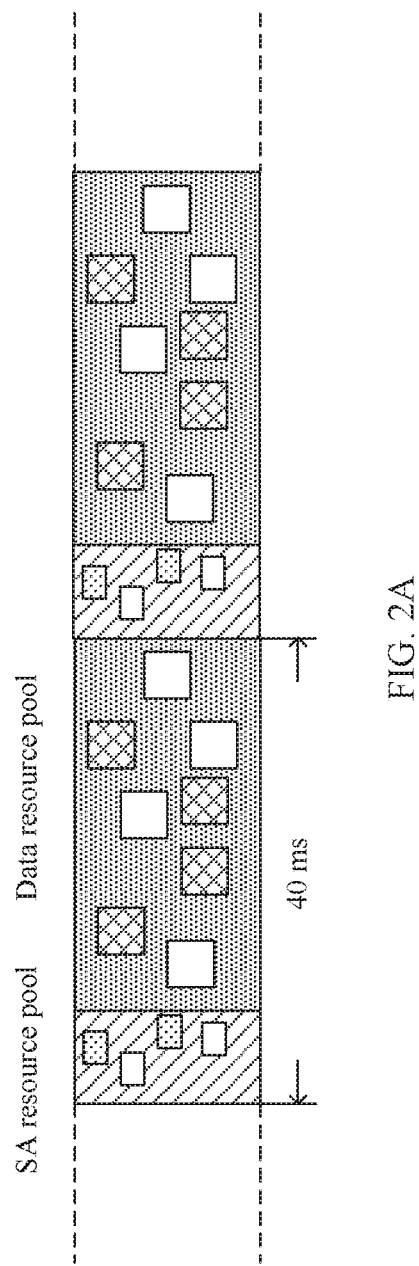
FIG. 2A to FIG. 2C are schematic structural diagrams of resource pools.

FIG. 2A is a schematic structural diagram of a resource pool in the D2D communications system. As can be learned from FIG. 2A, in the D2D communications system, a resource pool structure uses a time division multiplexing (TDM) mode.

Figure 2B:
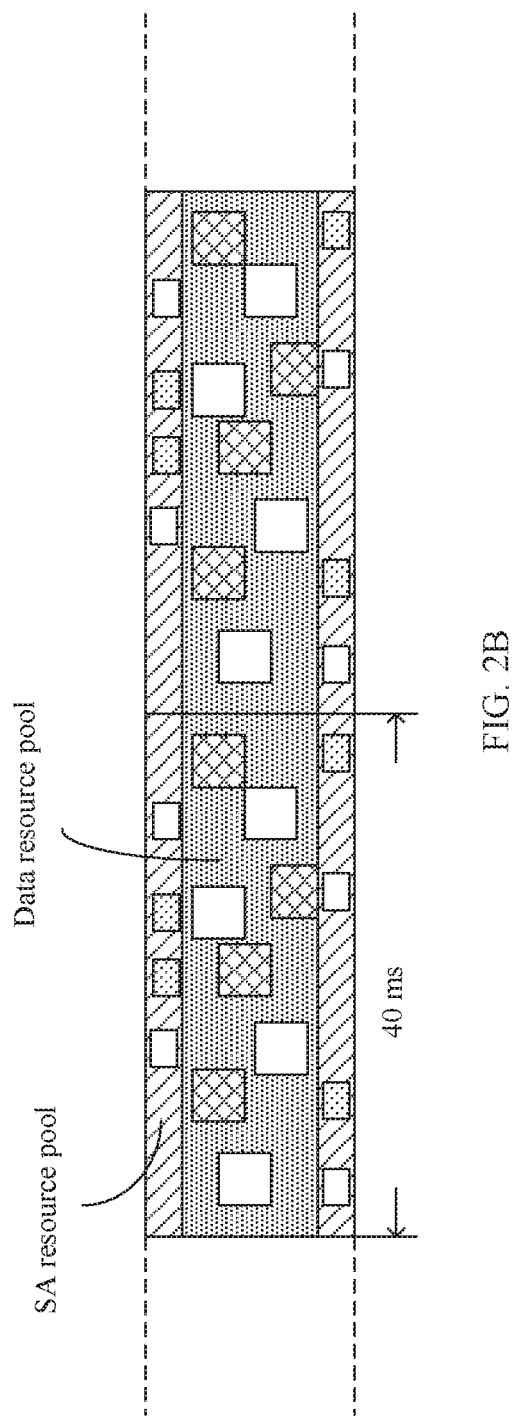
Figure 2C:
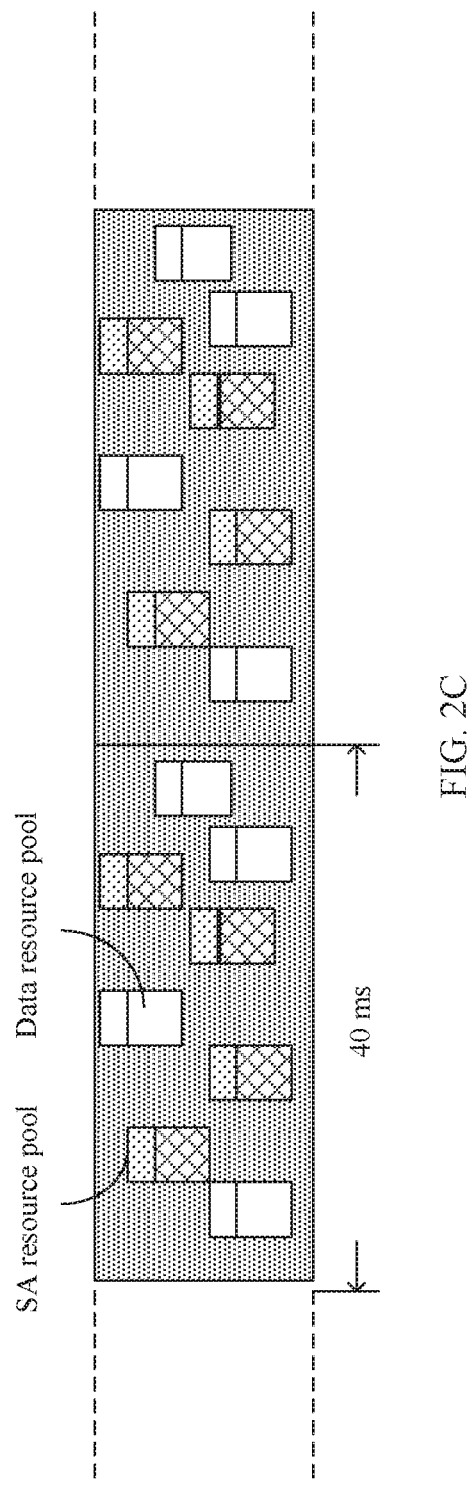

In the LTE-D2D technology, resource allocation in the communication mechanism is performed in units of periods. However, on a sidelink, a signaling link control information format 0 (SCI 0) is sent in an SA period to indicate information about a resource used in a data period. In this mode, it needs to be ensured that all terminals understand start positions and durations of the periods consistently. If the resource pool structure shown in FIG. 2A is used, because SA and corresponding data are sent separately, overall performance is affected. Therefore, the LTE-V technology may use resource pool structures shown in FIG. 2B and FIG. 2C. In FIG. 2B and FIG. 2C. SA and data are transmitted in a same subframe, and a frequency division multiplexing (FDM) mode is used. This mode greatly improves overall performance.

In the resource pool structures shown in FIG. 2A, FIG. 2B, and FIG. 2C, configurations of start time units of resource pool periods are the same, that is, every resource pool has a fixed start point. In a direct communication process, whichever resource pool structure shown in FIG. 2A, FIG. 2B, and FIG. 2C is used for data transmission, a terminal can perform data transmission only after waiting for a start point of a resource pool period. However, a data packet generation time of a terminal in a current communications network varies, and is relatively random. For example, an application layer of each vehicle on the Internet of Vehicles may send two types of data packets. One type is a periodic data packet sent continuously in a specified period, and although the data packet generated by each vehicle is periodic, a specific packet generation time of each vehicle is independent. The other type is an event-triggered data packet, and is mainly a data packet sent after an emergency event occurs. Therefore, it is quite possible that a data packet generation time of a terminal is not a start point of a resource pool period. When a quantity of terminals is relatively large, if transmission of each data packet of the terminals is limited to a unified period, generation of data packets by the terminals lacks randomness, and is not flexible, and transmission performance is affected. Further, a data packet arriving in a period can be transmitted only after a next period begins, and an unnecessary latency is caused.

An embodiment of the present invention provides a method for transmitting a data packet by a terminal. The method is more flexible, and can improve transmission performance and further reduce a transmission latency.

The following describes in detail a communication method and a communications apparatus provided by embodiments of the present invention with reference to specific embodiments of the present invention.

An embodiment of the present invention provides a communications apparatus. The communications apparatus is applied to a sending terminal. The communications apparatus applied to the sending terminal may determine a start time unit of a resource period, obtain a resource period parameter, and send communication data according to the start time unit of the resource period and the resource period parameter.

A function of the communications apparatus applied to the sending terminal may be implemented by hardware or may be implemented by corresponding software executed by hardware.

Figure 3:
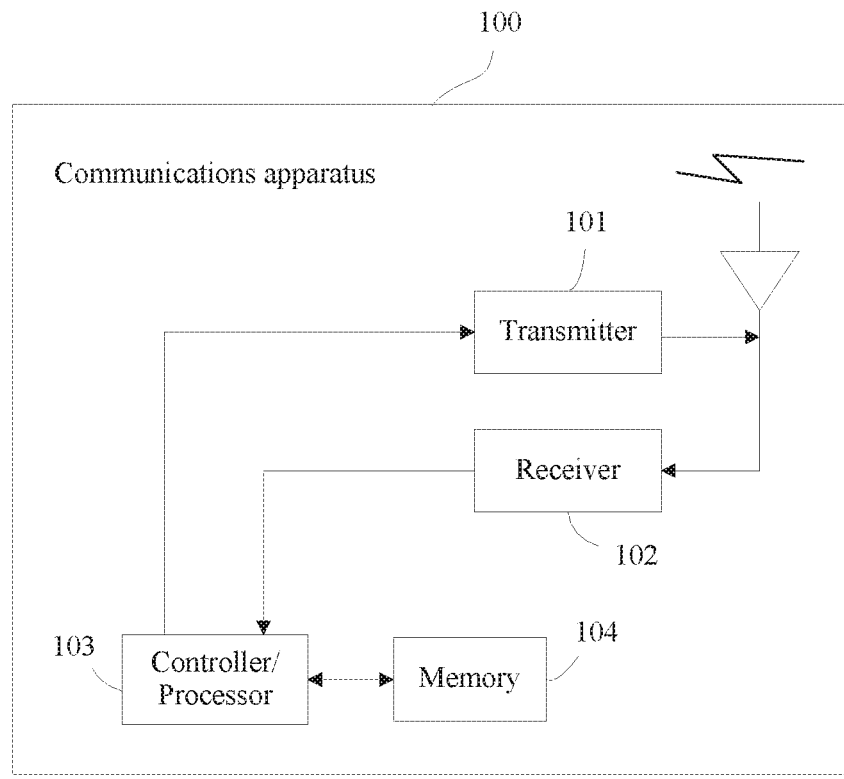
FIG. 3 is a schematic structural diagram of a communications apparatus applied to a sending terminal according to an embodiment of the present invention.

FIG. 3 is a schematic structural diagram of a communications apparatus 100 applied to a sending terminal according to an embodiment of the present invention. As shown in FIG. 3, the communications apparatus 100 applied to the sending terminal includes a transmitter 101, a receiver 102, a controller/processor 103, and a memory 104.

The memory 104 is configured to store program code executed by the controller/processor 103.

The controller/processor 103 is configured to invoke a program stored in the memory 104, determine a start time unit of a resource period, and obtain a resource period parameter by using the receiver 102, where the resource period parameter is sent by a network-side device or preconfigured by the sending terminal, there is at least one resource, and the resource period parameter includes a period duration of each of the at least one resource; and send, by using the transmitter 101, communication data according to the determined start time unit of the resource period and the received resource period parameter.

The receiver 102 is configured to obtain the resource period parameter.

Optionally, the receiver 102 obtains, from the network-side device according to a priority of the sending terminal, a resource period parameter corresponding to the priority; or the receiver 102 obtains, from the network-side device according to a type of the sent communication data, a resource period parameter corresponding to the communication data type, so that different terminals or a same terminal can use different resource periods in different cases.

The transmitter 101 is configured to send the communication data.

In this embodiment of the present invention, the communications apparatus 100 applied to the sending terminal determines the start time unit of the resource period for starting to send the communication data. Therefore, the start time unit of the resource period is random and more flexible, and can adapt to a randomness feature of a data packet generation time of the terminal, and further, communication data transmission performance can be improved, and a latency can be reduced.

Optionally, when determining the start time unit of the resource period, the controller/processor 103 may use different determining manners according to a specific mode of the sending terminal. The sending terminal may send the communication data in two modes. In one mode, the sending terminal sends the communication data by using a time domain resource allocated by the network-side device to the sending terminal. In the other mode, the terminal autonomously selects a time domain resource to send the communication data.

The sending terminal uses the time domain resource allocated by the network-side device to send the communication data, and the controller/processor 103 may determine the start time unit of the resource period in the following two manners:

Manner 1: Use a $K^{th}$ sidelink subframe that is after a sidelink subframe corresponding to a subframe in which scheduling information is received, as the start time unit of the resource period; or use a sidelink subframe corresponding to a $K^{th}$ subframe that is after a subframe in which scheduling information is received, as the start time unit of the resource period; where K is a non-negative integer, and the scheduling information is sent by the network-side device.

Manner 2: Use a time unit indicated by scheduling information, as the start time unit of the resource period, where the scheduling information is sent by the network-side device.

The controller/processor 103 may select, according to an actual situation, one of the foregoing two manners to determine a start time unit of a period of an available resource. In a possible implementation, before the controller/processor 103 determines the start time unit of the period, if the network-side device can obtain an offset between a system frame number (SFN) and a direct frame number (DFN), where the offset is obtained and sent by the sending terminal to a network side, the manner 2 may be used, and the network-side device indicates, in the sent scheduling information, the start time unit of the period of the resource available to the sending terminal. Using the manner 2, the network-side device directly indicates the start time unit of the resource period. This can avoid a fuzzy resource configuration problem.

The sending terminal sends the communication data by using the autonomously selected time domain resource, and the controller/processor 103 may use a start subframe for sending a transport block at a higher layer, as the start time unit of the resource period.

In this embodiment of the present invention, the transmitter 101 is further configured to send period parameter adjustment instruction information to the network-side device; and the receiver 102 is further configured to obtain a resource period parameter obtained by the network-side device after adjustment.

The transmitter 101 is further configured to send transmission sequence number indication information and time domain transmission resource indication information to a receiving terminal that performs direct communication with the sending terminal, or send period start point indication information and time domain transmission resource indication information to a receiving terminal that performs direct communication with the sending terminal, so that the receiving terminal obtains a time domain resource position of the communication data that the sending terminal transmits every time in the used resource period.

The transmission sequence number indication information is used to indicate a transmission sequence number of the sent communication data in the resource period; the period start point indication information is used to indicate the start time unit of the resource period; and the time domain transmission resource indication information is used to indicate the time domain resource position that is occupied every time to send the communication data in the resource period, and that is relative to the start time unit of the resource period.

Optionally, the transmitter 101 is further configured to send resource period indication information to the receiving terminal that performs direct communication with the sending terminal, where the resource period indication information is used to indicate the resource period used by the sending terminal, so that the receiving terminal can receive the communication data according to the resource period indicated by the sending terminal and determine the time domain resource position occupied by the communication data.

In the communications apparatus applied to the sending terminal in this embodiment of the present invention, the hardware or software that executes a corresponding function includes one or more modules corresponding to the function. The module may be software and/or hardware.

Figure 4:
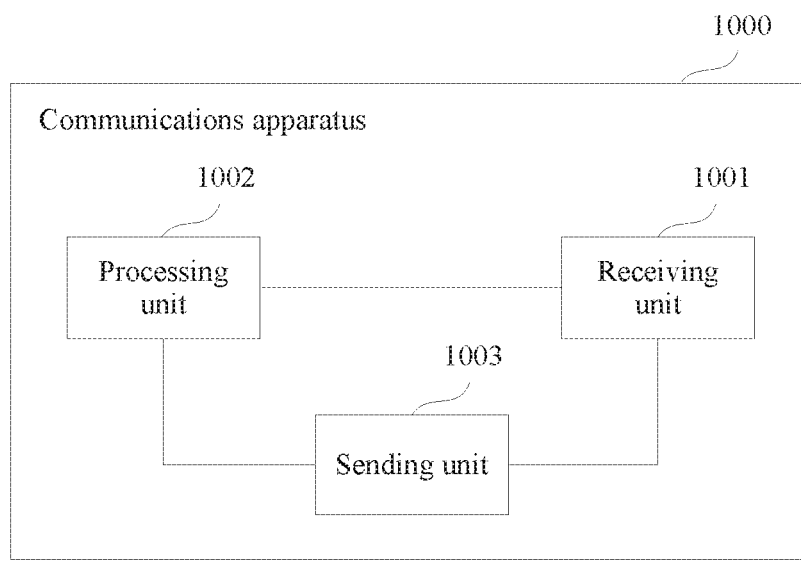
FIG. 4 is another schematic structural diagram of a communications apparatus applied to a sending terminal according to an embodiment of the present invention.

FIG. 4 is a schematic structural diagram of a communications apparatus 1000 applied to a sending terminal according to an embodiment of the present invention. As shown in FIG. 4, the communications apparatus 1000 applied to the sending terminal includes a receiving unit 1001, a processing unit 1002, and a sending unit 1003. The receiving unit 1001 is configured to obtain a resource period parameter, where the resource period parameter is sent by a network-side device or preconfigured by the sending terminal, there is at least one resource, and the resource period parameter includes a period duration of each of the at least one resource. The processing unit 1002 is configured to determine a start time unit of a resource period. The sending unit 1003 is configured to send communication data according to the start time unit of the resource period determined by the processing unit 1002 and the resource period parameter received by the receiving unit 1001.

The communications apparatus 1000 determines the start time unit of the resource period for starting to send the communication data Therefore, the start time unit of the resource period is random and more flexible, and can adapt to a randomness feature of a data packet generation time of the terminal, and further, communication data transmission performance can be improved, and a latency can be reduced.

Optionally, the receiving unit 1001 obtains, from the network-side device according to a priority of the sending terminal, a resource period parameter corresponding to the priority; or the receiving unit 1001 obtains, from the network-side device according to a type of the sent communication data, a resource period parameter corresponding to the communication data type, so that different terminals or a same terminal can use different resource periods in different cases.

Optionally, the sending terminal sends the communication data by using a time domain resource allocated by the network-side device; and the processing unit 1002 may determine the start time unit of the resource period in the following manners:

Manner 1: Use a $K^{th}$ sidelink subframe that is after a sidelink subframe corresponding to a subframe in which scheduling information is received, as the start time unit of the resource period; or use a sidelink subframe corresponding to a $K^{th}$ subframe that is after a subframe in which scheduling information is received, as the start time unit of the resource period; where K is a non-negative integer, and the scheduling information is sent by the network-side device.

Manner 2: Use a time unit indicated by scheduling information, as the start time unit of the resource period, where the scheduling information is sent by the network-side device.

When the processing unit 1002 determines the start time unit of the resource period in the manner 2, the receiving unit 1001 is further configured to obtain an offset between a system frame number (SFN) and a direct frame number (DFN) before the processing unit 1002 determines the start time unit of the resource period.

Using the manner 2, the network-side device directly indicates the start time unit of the resource period. This can avoid a fuzzy resource configuration problem.

Optionally, the sending terminal sends the communication data by using an autonomously selected time domain resource; and the processing unit 1002 specifically determines the start time unit of the resource period in the following manner: using a start subframe for sending a transport block at a higher layer, as the start time unit of the resource period.

Optionally, the sending unit 1003 is further configured to send period parameter adjustment instruction information to the network-side device; and the receiving unit 1001 is further configured to obtain a resource period parameter obtained by the network-side device after adjustment.

Optionally, the sending unit 1003 is further configured to send transmission sequence number indication information and time domain transmission resource indication information to a receiving terminal that performs direct communication with the sending terminal, or send period start point indication information and time domain transmission resource indication information to a receiving terminal that performs direct communication with the sending terminal, so that the receiving terminal obtains a time domain resource position of the communication data that the sending terminal transmits every time in the used resource period.

The transmission sequence number indication information is used to indicate a transmission sequence number of the sent communication data in the resource period; the period start point indication information is used to indicate the start time unit of the resource period; and the time domain transmission resource indication information is used to indicate the time domain resource position that is occupied every time to send the communication data in the resource period, and that is relative to the start time unit of the resource period.

Optionally, the sending unit 1003 is further configured to send resource period indication information to the receiving terminal that performs direct communication with the sending terminal, where the resource period indication information is used to indicate the resource period used by the sending terminal, so that the receiving terminal can receive the communication data according to the resource period indicated by the sending terminal and determine the time domain resource position occupied by the communication data.

An embodiment of the present invention further provides a communications apparatus applied to a receiving terminal. The communications apparatus applied to the receiving terminal may obtain transmission sequence number indication information and time domain transmission resource indication information sent by a sending terminal that performs device-to-device communication with the receiving terminal, or configured to obtain period start point indication information and time domain transmission resource indication information sent by a sending terminal that performs device-to-device communication with the receiving terminal.

A function of the communications apparatus applied to the receiving terminal may be implemented by hardware or may be implemented by corresponding software executed by hardware.

Figure 5:
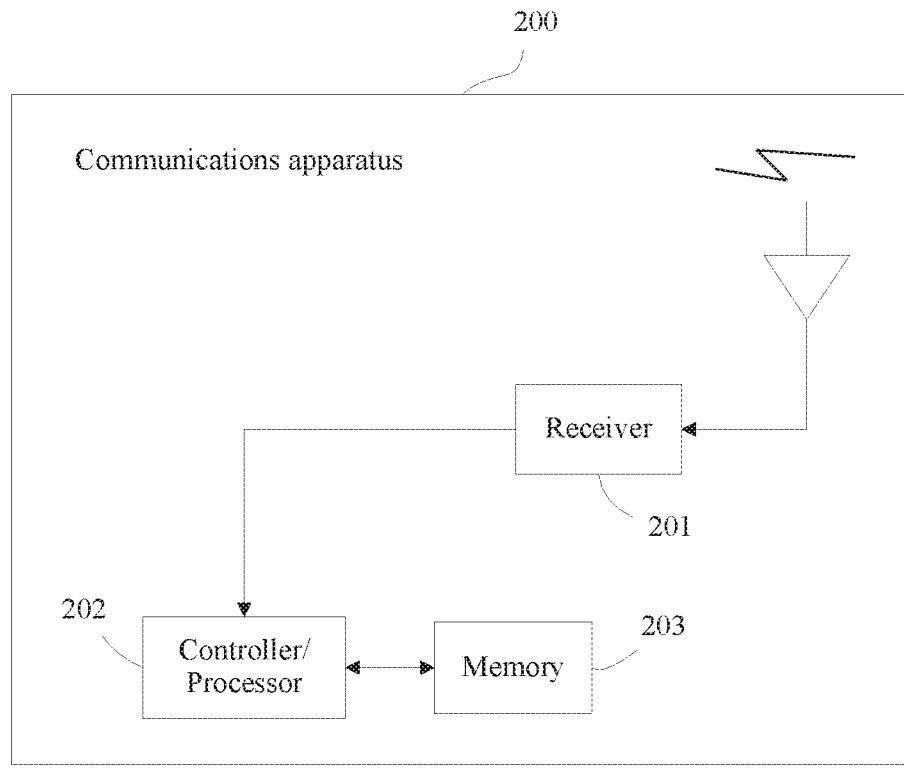
FIG. 5 is a schematic structural diagram of a communications apparatus applied to a receiving terminal according to an embodiment of the present invention.

FIG. 5 is a schematic structural diagram of a communications apparatus 200 applied to a receiving terminal according to an embodiment of the present invention. The communications apparatus 200 includes a receiver 201, a controller/processor 202, and a memory 203.

The memory 203 is configured to store program code executed by the controller/processor 202.

The receiver 201 is configured to obtain transmission sequence number indication information and time domain transmission resource indication information sent by a sending terminal that performs device-to-device communication with the receiving terminal, or configured to obtain period start point indication information and time domain transmission resource indication information sent by a sending terminal that performs device-to-device communication with the receiving terminal.

The transmission sequence number indication information is used to indicate a transmission sequence number of sent communication data in the resource period; the period start point indication information is used to indicate a start time unit of the resource period; and the time domain transmission resource indication information is used to indicate a time domain resource position that is occupied every time to send the communication data in the resource period, and that is relative to the start time unit of the resource period.

The controller/processor 202 is configured to invoke a program stored in the memory 203, and obtain, by using the receiver 201, the transmission sequence number indication information and the time domain transmission resource indication information sent by the sending terminal that performs device-to-device communication with the receiving terminal, or configured to obtain the period start point indication information and the time domain transmission resource indication information sent by the sending terminal that performs device-to-device communication with the receiving terminal, and determine, according to the obtained transmission sequence number indication information and time domain transmission resource indication information, the time domain resource position of the communication data that the sending terminal sends every time in the resource period in time domain transmission.

In the communications apparatus applied to the receiving terminal in this embodiment of the present invention, the hardware or software that executes a corresponding function includes one or more modules corresponding to the function. The module may be software and/or hardware.

Figure 6:
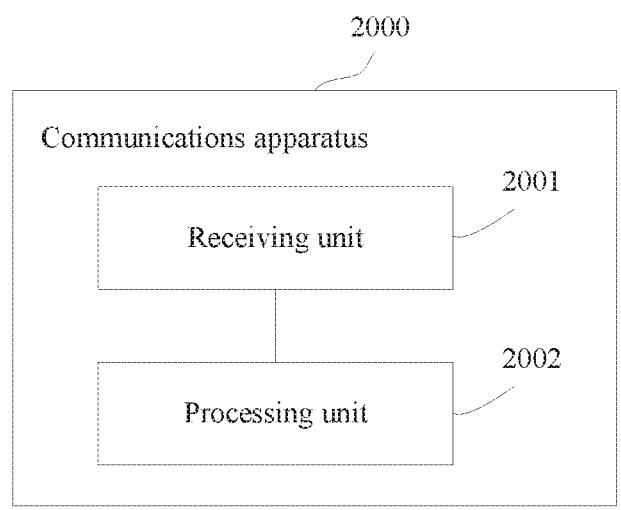
FIG. 6 is another schematic structural diagram of a communications apparatus applied to a receiving terminal according to an embodiment of the present invention.

FIG. 6 is a schematic structural diagram of a communications apparatus 2000 applied to a receiving terminal according to an embodiment of the present invention. As shown in FIG. 6, the communications apparatus 2000 includes a receiving unit 2001 and a processing unit 2002.

The receiving unit 2001 is configured to obtain transmission sequence number indication information and time domain transmission resource indication information sent by a sending terminal that performs device-to-device communication with the receiving terminal, or configured to obtain period start point indication information and time domain transmission resource indication information sent by a sending terminal that performs device-to-device communication with the receiving terminal. The transmission sequence number indication information is used to indicate a transmission sequence number of sent communication data in the resource period; the period start point indication information is used to indicate a start time unit of the resource period; and the time domain transmission resource indication information is used to indicate a time domain resource position that is occupied every time to send the communication data in the resource period, and that is relative to the start time unit of the resource period.

The processing unit 2002 is configured to determine, according to the transmission sequence number indication information and the time domain transmission resource indication information obtained by the receiving unit 2001, the time domain resource position of the communication data that the sending terminal sends every time in the resource period in time domain transmission.

An embodiment of the present invention further provides a communications apparatus applied to a network-side device. The communications apparatus applied to the network-side device may determine a resource period parameter and send the determined resource period parameter.

A function of the communications apparatus applied to the network-side device may be implemented by hardware or may be implemented by corresponding software executed by hardware.

Figure 7:
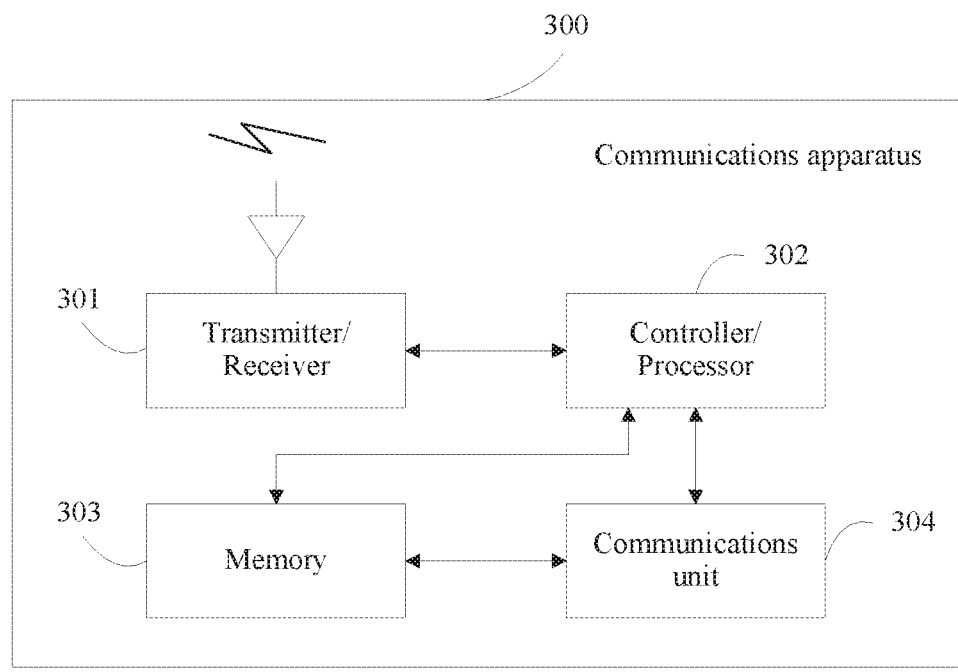
FIG. 7 is a schematic structural diagram of a communications apparatus applied to a network-side device according to an embodiment of the present invention.

FIG. 7 is a schematic structural diagram of a communications apparatus 300 applied to a network-side device according to an embodiment of the present invention. As shown in FIG. 7, the communications apparatus 300 includes a transmitter/receiver 301, a controller/processor 302, a memory 303, and a communications unit 304. In this embodiment of the present invention:

The memory 303 is configured to store program code executed by the controller/processor 302.

The controller/processor 302 is configured to invoke a program stored in the memory 303, determine a resource period parameter, and send the determined resource period parameter by using the transmitter/receiver 301.

The transmitter/receiver 301 is configured to send the determined resource period parameter.

The communications unit 304 is configured to support the network-side device in performing communication with another network entity.

Optionally, the transmitter/receiver 301 is further configured to send scheduling information, where the scheduling information includes a start time unit of a resource period. This can avoid a fuzzy resource configuration problem.

Optionally, the transmitter/receiver 301 is further configured to receive period parameter adjustment instruction information sent by a terminal. The controller/processor 302 is further configured to adjust the resource period parameter according to the received period parameter adjustment instruction information. The transmitter/receiver 301 is further configured to send a resource period parameter obtained after adjustment, so as to adjust a resource period used by the terminal.

In the communications apparatus applied to the network-side device, the hardware or software that executes a corresponding function includes one or more modules corresponding to the function. The module may be software and/or hardware.

Figure 8A:
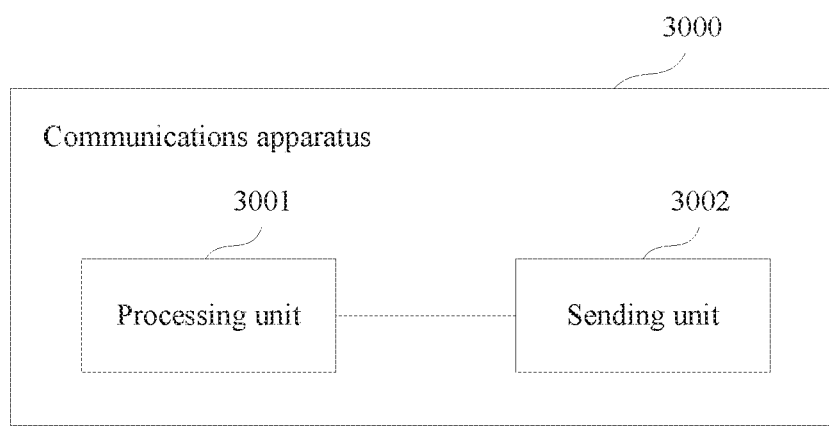
FIG. 8A and FIG. 8B are another schematic structural diagram of a communications apparatus applied to a network-side device according to an embodiment of the present invention.

FIG. 8A is a schematic structural diagram of a communications apparatus 3000 applied to a network-side device according to an embodiment of the present invention. As shown in FIG. 8A, the communications apparatus 3000 includes a processing unit 3001 and a sending unit 3002.

The processing unit 3001 is configured to determine a resource period parameter.

The sending unit 3002 is configured to send the resource period parameter determined by the processing unit.

Optionally, the sending unit 3002 is further configured to send scheduling information, where the scheduling information includes a start time unit of a resource period. This can avoid a fuzzy resource configuration problem.

Figure 8B:
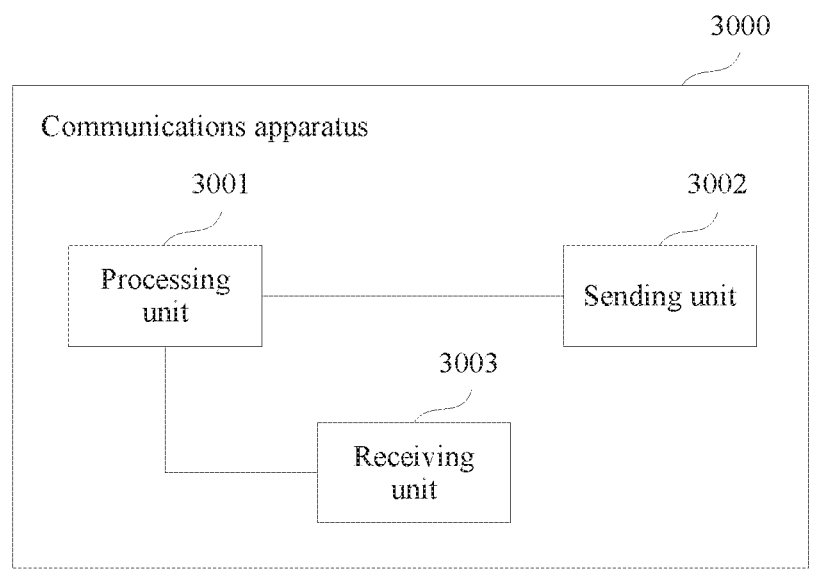

Optionally, to adjust a resource period used by a terminal, the communications apparatus 3000 further includes a receiving unit 3003, as shown in FIG. 8B.

The receiving unit 3003 is configured to receive period parameter adjustment instruction information sent by the terminal.

The processing unit 3001 is further configured to adjust the resource period parameter according to the period parameter adjustment instruction information received by the receiving unit.

The sending unit 3002 is further configured to send a resource period parameter obtained after adjustment, so as to adjust the resource period used by the terminal.

An embodiment of the present invention further provides a communications apparatus. The communications apparatus is applied to a sending terminal. The communications apparatus applied to the sending terminal may receive time unit indication information from a network-side device in an air interface time unit, determine a sidelink time unit according to the air interface time unit and the time unit indication information, and send communication data in the sidelink time unit.

A function of the communications apparatus applied to the sending terminal may be implemented by hardware or may be implemented by corresponding software executed by hardware.

Figure 9:
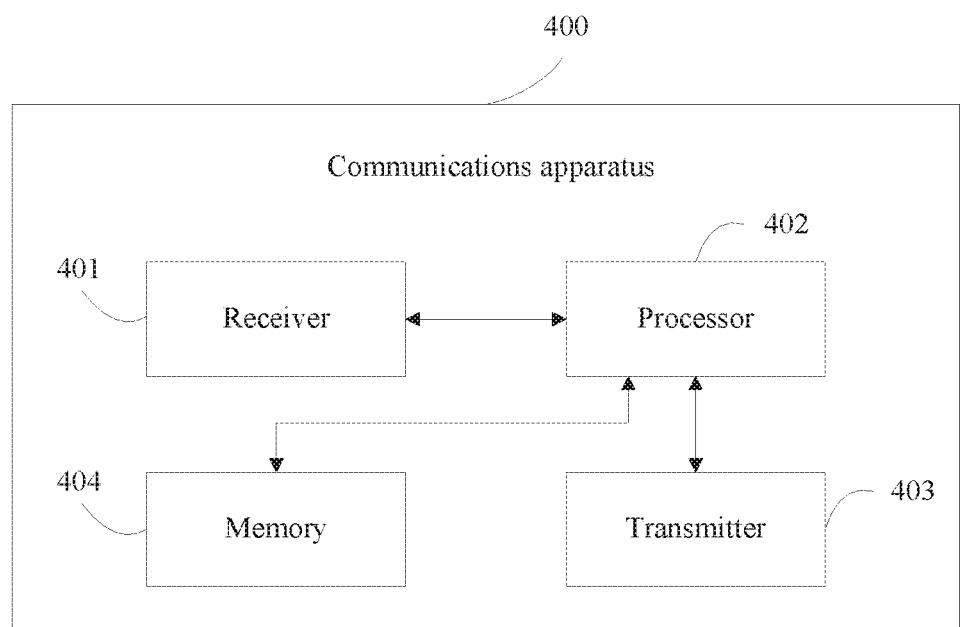
FIG. 9 is a schematic structural diagram of a communications apparatus applied to a sending terminal according to an embodiment of the present invention.

FIG. 9 is a schematic structural diagram of a communications apparatus 400 applied to a sending terminal according to an embodiment of the present invention. As shown in FIG. 9, the communications apparatus 400 applied to the sending terminal includes a receiver 401, a processor 402, and a transmitter 403. The communications apparatus 400 may further include a memory 404. The memory 404 is configured to store program code executed by the processor 402.

The processor 402 is configured to invoke a program stored in the memory 404 to execute the following functions:

receiving, by using the receiver 401, time unit indication information from a network-side device in an air interface time unit, where the time unit indication information is used to indicate a correspondence between an air interface time unit and a sidelink time unit; determining the sidelink time unit according to the air interface time unit and the time unit indication information; and sending communication data in the sidelink time unit by using the transmitter 403.

Optionally, the time unit indication information is used to indicate one of two sidelink time units that temporally overlap a $K^{th}$ air interface time unit that is after the air interface time unit, where K is a positive integer. K is a predefined fixed value, or is a value sent by the network-side device.

The processor 402 determines, according to the time unit indication information, one sidelink time unit in the two sidelink time units that temporally overlap the $K^{th}$ air interface time unit that is after the air interface time unit, as the sidelink time unit.

Optionally, the time unit indication information indicates one of the two sidelink time units in any one of the following manners:

indicating one sidelink time unit whose sequence number is an odd number and that is of the two sidelink time units; indicating one sidelink time unit whose sequence number is an even number and that is of the two sidelink time units; indicating one sidelink time unit whose time is earlier and that is of the two sidelink time units; or indicating one sidelink time unit whose time is later and that is of the two sidelink time units.

Optionally, the time unit indication information is used to indicate a time unit sequence number in a frame on a sidelink; and the processor 402 uses a sidelink time unit corresponding to the time unit sequence number on the sidelink as the sidelink time unit; where a time of the sidelink time unit corresponding to the time unit sequence number is later than that of the air interface time unit.

Optionally, the time unit indication information is used to indicate at least one of at least one sidelink time unit indicated by subframe scheduling correspondence information, and the subframe scheduling correspondence information is used to indicate at least one sidelink time unit corresponding to the air interface time unit; and the processor 402 determines, according to the air interface time unit and the subframe scheduling information, the at least one sidelink time unit corresponding to the air interface time unit, and uses the at least one sidelink time unit that is indicated by the time unit indication information, and that is of the at least one sidelink time unit corresponding to the air interface time unit, as the sidelink time unit.

The subframe scheduling correspondence information is predefined in a system or configured by the network-side device.

Optionally, the time unit indication information is used to indicate a sidelink time unit corresponding to a $K^{th}$ air interface time unit that is after the air interface time unit in which the time unit indication information is received, where K is a positive integer; and the processor 402 uses the sidelink time unit corresponding to the $K^{th}$ air interface time unit that is after the air interface time unit, as the sidelink time unit for sending the communication data.

In the communications apparatus applied to the sending terminal, the hardware or software that executes a corresponding function includes one or more modules corresponding to the function. The module may be software and/or hardware.

Figure 10:
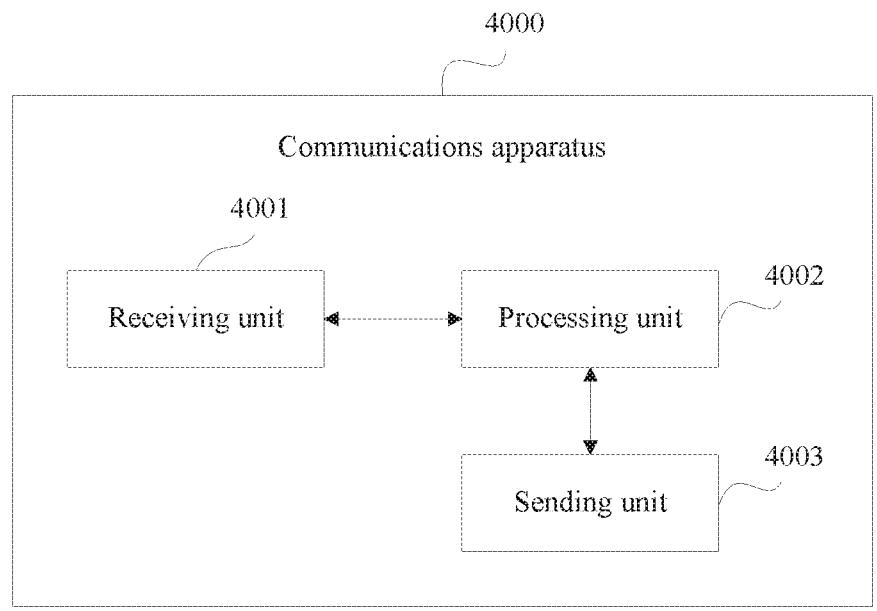
FIG. 10 is another schematic structural diagram of a communications apparatus applied to a sending terminal according to an embodiment of the present invention.

FIG. 10 is a schematic structural diagram of a communications apparatus 4000 applied to a sending terminal according to an embodiment of the present invention. Referring to FIG. 10, the communications apparatus 4000 applied to the sending terminal includes a receiving unit 4001, a processing unit 4002, and a sending unit 4003.

The receiving unit 4001 is configured to receive time unit indication information from a network-side device in an air interface time unit, where the time unit indication information is used to indicate a correspondence between an air interface time unit and a sidelink time unit. The processing unit 4002 is configured to determine the sidelink time unit according to the air interface time unit and the time unit indication information received by the receiving unit 4001. The sending unit 4003 is configured to send communication data in the sidelink time unit determined by the processing unit 4002.

Optionally, the time unit indication information is used to indicate one of two sidelink time units that temporally overlap a $K^{th}$ air interface time unit that is after the air interface time unit, where K is a positive integer.

The processing unit 4002 determines, according to the time unit indication information, one sidelink time unit in the two sidelink time units that temporally overlap the $K^{th}$ air interface time unit that is after the air interface time unit, as the sidelink time unit.

The time unit indication information may indicate one of the two sidelink time units in any one of the following manners: indicating one sidelink time unit whose sequence number is an odd number and that is of the two sidelink time units; indicating one sidelink time unit whose sequence number is an even number and that is of the two sidelink time units; indicating one sidelink time unit whose time is earlier and that is of the two sidelink time units; or indicating one sidelink time unit whose time is later and that is of the two sidelink time units.

K is a predefined fixed value, or is a value sent by the network-side device.

Optionally, the time unit indication information is used to indicate a time unit sequence number in a frame on a sidelink; and the processing unit 4002 uses a sidelink time unit corresponding to the time unit sequence number on the sidelink as the sidelink time unit; where a time of the sidelink time unit corresponding to the time unit sequence number is later than that of the air interface time unit.

Optionally, the time unit indication information is used to indicate at least one of at least one sidelink time unit indicated by subframe scheduling correspondence information, and the subframe scheduling correspondence information is used to indicate at least one sidelink time unit corresponding to the air interface time unit; and the processing unit 4002 determines, according to the air interface time unit and the subframe scheduling information, the at least one sidelink time unit corresponding to the air interface time unit, and uses the at least one sidelink time unit that is indicated by the time unit indication information, and that is of the at least one sidelink time unit corresponding to the air interface time unit, as the sidelink time unit.

The subframe scheduling correspondence information is predefined in a system or configured by the network-side device.

Optionally, the time unit indication information is used to indicate a sidelink time unit corresponding to a $K^{th}$ air interface time unit that is after the air interface time unit in which the time unit indication information is received, where K is a positive integer; and the processing unit uses the sidelink time unit corresponding to the $K^{th}$ air interface time unit that is after the air interface time unit, as the sidelink time unit for sending the communication data.

An embodiment of the present invention further provides a communications apparatus applied to a network-side device. The communications apparatus applied to the network-side device may send time unit indication information to a sending terminal in an air interface time unit, where the time unit indication information is used to indicate a correspondence between an air interface time unit and a sidelink time unit, and the sending terminal determines the sidelink time unit according to the air interface time unit and the time unit indication information.

A function of the communications apparatus applied to the network-side device may be implemented by hardware or may be implemented by corresponding software executed by hardware.

Figure 11:
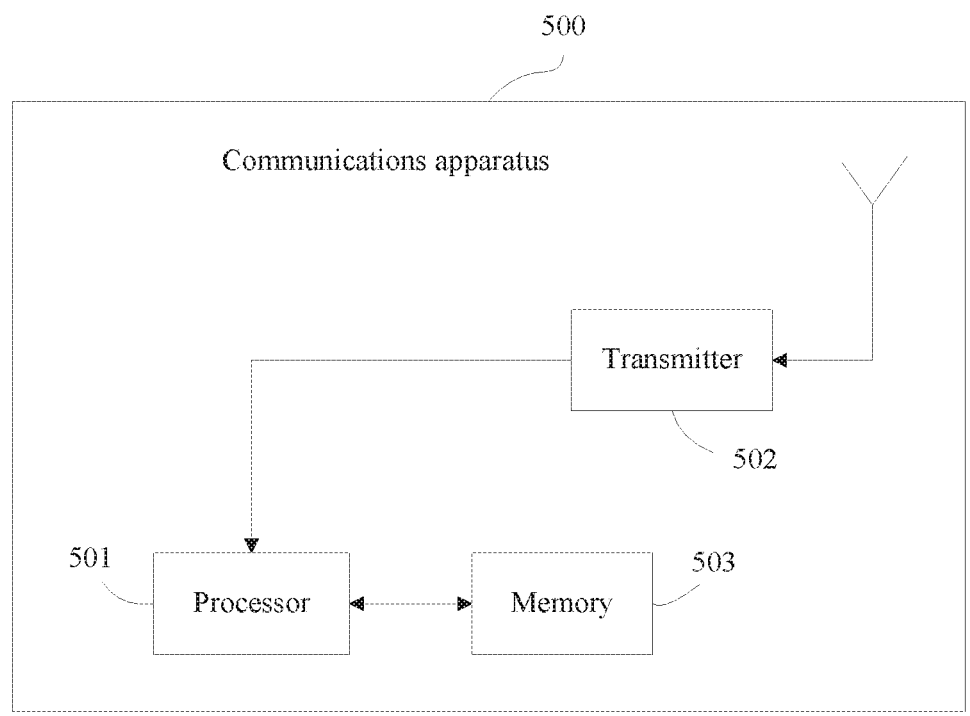
FIG. 11 is a schematic structural diagram of a communications apparatus applied to a network device according to an embodiment of the present invention.

FIG. 11 is a schematic structural diagram of a communications apparatus 500 applied to a network-side device according to an embodiment of the present invention. As shown in FIG. 11, the communications apparatus 500 applied to the network-side device includes a processor 501 and a transmitter 502. The communications apparatus 500 may further include a memory 503. The memory 503 is configured to store program code executed by the processor 501.

The processor 501 is configured to invoke a program stored in the memory 503 to execute the following functions:

determining time unit indication information, and sending, in an air interface time unit by using the transmitter 502, the time unit indication information determined by the processing unit to a sending terminal, where the time unit indication information is used to indicate a correspondence between an air interface time unit and a sidelink time unit, and the sending terminal determines the sidelink time unit according to the air interface time unit and the time unit indication information.

Optionally, the time unit indication information is used to indicate one of two sidelink time units that temporally overlap a $K^{th}$ air interface time unit that is after the air interface time unit, where K is a positive integer.

The time unit indication information indicates one of the two sidelink time units in any one of the following manners: indicating one sidelink time unit whose sequence number is an odd number and that is of the two sidelink time units; indicating one sidelink time unit whose sequence number is an even number and that is of the two sidelink time units; indicating one sidelink time unit whose time is earlier and that is of the two sidelink time units; or indicating one sidelink time unit whose time is later and that is of the two sidelink time units.

K is a predefined fixed value, or is a value sent by the network-side device.

Optionally, the time unit indication information is used to indicate a time unit sequence number in a frame on a sidelink.

Optionally, the time unit indication information is used to indicate at least one of at least one sidelink time unit indicated by subframe scheduling correspondence information, and the subframe scheduling correspondence information is used to indicate at least one sidelink time unit corresponding to the air interface time unit.

Optionally, the subframe scheduling correspondence information is predefined in a system or configured by the network-side device.

Optionally, the time unit indication information is used to indicate a sidelink time unit corresponding to a $K^{th}$ air interface time unit that is after the air interface time unit in which the time unit indication information is received, where K is a positive integer.

In the communications apparatus applied to the network-side device, the hardware or software that executes a corresponding function includes one or more modules corresponding to the function. The module may be software and/or hardware.

Figure 12:
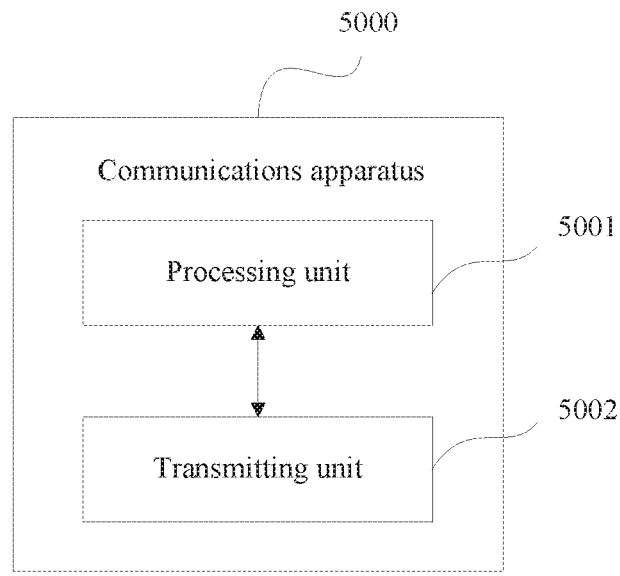
FIG. 12 is another schematic structural diagram of a communications apparatus applied to a network device according to an embodiment of the present invention.

FIG. 12 is a schematic structural diagram of a communications apparatus 5000 applied to a network-side device according to an embodiment of the present invention. As shown in FIG. 12, the communications apparatus 5000 applied to the network-side device includes a processing unit 5001 and a transmitting unit 5002. The processing unit 5001 is configured to determine time unit indication information. The transmitting unit 5002 is configured to send, in an air interface time unit, the time unit indication information determined by the processing unit to a sending terminal, where the time unit indication information is used to indicate a correspondence between an air interface time unit and a sidelink time unit, and the sending terminal determines the sidelink time unit according to the air interface time unit and the time unit indication information.

Optionally, the time unit indication information may be used to indicate one of two sidelink time units that temporally overlap a $K^{th}$ air interface time unit that is after the air interface time unit, where K is a positive integer. K is a predefined fixed value, or is a value sent by the network-side device.

The time unit indication information indicates one of the two sidelink time units in any one of the following manners: indicating one sidelink time unit whose sequence number is an odd number and that is of the two sidelink time units; indicating one sidelink time unit whose sequence number is an even number and that is of the two sidelink time units; indicating one sidelink time unit whose time is earlier and that is of the two sidelink time units; or indicating one sidelink time unit whose time is later and that is of the two sidelink time units.

The time unit indication information may be used to indicate a time unit sequence number in a frame on a sidelink.

The time unit indication information is used to indicate at least one of at least one sidelink time unit indicated by subframe scheduling correspondence information, and the subframe scheduling correspondence information is used to indicate at least one sidelink time unit corresponding to the air interface time unit.

The subframe scheduling correspondence information is predefined in a system or configured by the network-side device.

The time unit indication information is used to indicate a sidelink time unit corresponding to a $K^{th}$ air interface time unit that is after the air interface time unit in which the time unit indication information is received, where K is a positive integer.

It should be noted that, the controller/processor in the network-side device and the terminal may be a general-purpose central processing unit (CPU), a microprocessor, an application-specific integrated circuit (ASIC), or one or more integrated circuits for controlling program execution in the solution of the present invention. One or more memories included in a computer system may be a read-only memory (ROM) or other types of static storage devices capable of storing static information and instructions, or a random access memory (RAM) or other types of dynamic storage devices capable of storing information and instructions, or may be a magnetic disk storage. The memories are connected to the processor by a bus.

It may be understood that, structures of the network-side device and the terminal in the drawings of the foregoing embodiments are only simplified designs for the network-side device and the terminal, but this is not limited. In an actual application, the network-side device may include any quantity of transmitters, receivers, processors, controllers, memories, communications units, and the like, and the terminal may further include an encoder, a modulator, a demodulator, a decoder, and the like.

Communication methods in embodiments of the present invention implemented by a network-side device and a terminal are described in detail in the following embodiments of the present invention.

Figure 13:
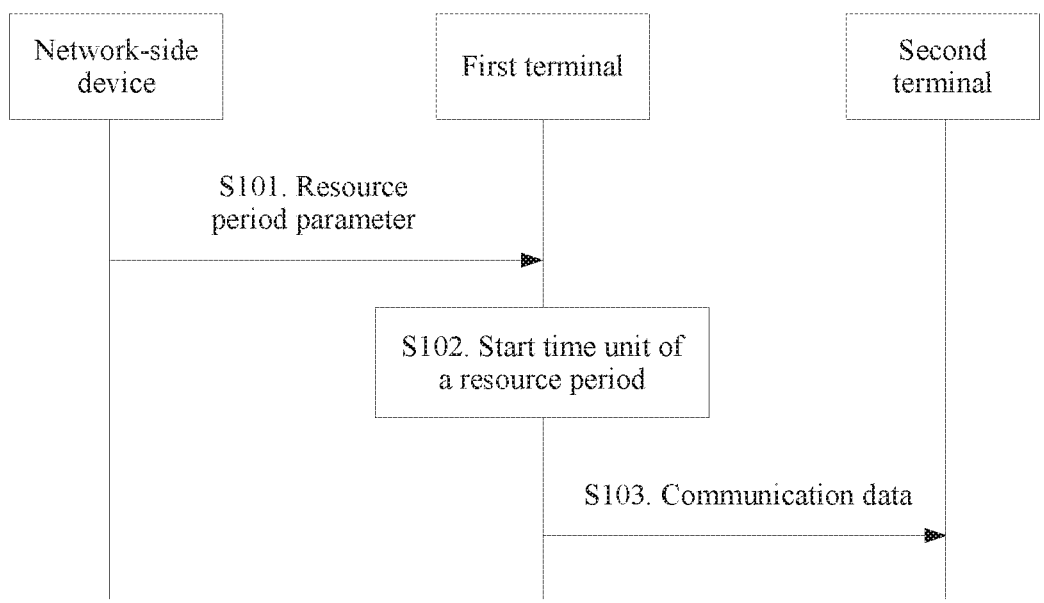
FIG. 13 is a schematic implementation flowchart of a communication method according to an embodiment of the present invention.

FIG. 13 is a schematic flowchart of a communication method according to an embodiment of the present invention. As shown in FIG. 13, the method includes the following steps.

S101. A network-side device configures and sends a resource period parameter.

In this embodiment of the present invention, a quantity of resources configured by the network-side device is at least one. For example, the resource may be understood as a resource pool. The resource period parameter includes a period duration of each of the at least one resource, the resource may include one or more periods, and the period duration may be understood as a quantity of occupied subframes.

The network-side device may allocate at least one resource to a terminal. Therefore, the resource period parameter sent by the network-side device also includes at least one resource period duration, and a specific quantity of included resource period durations is consistent with the quantity of resources allocated by the network-side device.

The network-side device may configure a sending resource period parameter and a receiving resource period parameter separately. A terminal used as a sending terminal receives the sending resource period parameter sent by the network-side device, and sends communication data according to the sending resource period parameter. A terminal used as a receiving terminal receives the receiving resource period parameter sent by the network-side device, and receives the communication data according to the receiving resource period parameter.

For ease of description in this embodiment of the present invention, the terminal used as the sending terminal is referred to as a first terminal, and the terminal used as the receiving terminal is referred to as a second terminal.

When the network-side device sends the resource period parameter, the network-side device may broadcast related period parameters to covered terminals by using system information, or separately send related period parameters to some covered terminals in a connected mode by using radio resource control (RRC) signaling.

S102. A first terminal determines a start time unit of a resource period, and sends data according to the obtained resource period parameter.

The start time unit of the period that is determined by the first terminal in this embodiment of the present invention may be understood as a start subframe of a period for starting to send the communication data by the first terminal, and a subsequent data packet is sent periodically based on the first start time unit and period.

The resource period parameter obtained by the first terminal shown in the figure in this embodiment of the present invention is sent by the network-side device, but this is not limited. The resource period parameter obtained by the first terminal in this embodiment of the present invention may also be preconfigured and may be applicable to a scenario without network coverage.

In this embodiment of the present invention, the first terminal determines the start time unit of the resource period for starting to send the communication data. Therefore, the start time unit of the resource period is random and more flexible, and can adapt to a randomness feature of a data packet generation time of the terminal, and further, communication data transmission performance can be improved, and a latency can be reduced.

S103. A second terminal receives the communication data sent by the first terminal.

The following further describes the process of randomly determining the start time unit of the resource period for performing communication in this embodiment of the present invention.

In S101, the network-side device may configure different resource period parameters according to a type of the terminal, a priority of the terminal, a type of the communication data sent by the terminal, and the like. For example, in LTE-V, vehicles have K different priorities, arranged as $S_1, S_2, \ldots,$ and SK from high to low, and corresponding sending resource periods configured by the network-side device for the priorities are $T_1, T_2, \ldots,$ and $T_K$ respectively, that is, a vehicle with a priority $S_i$ uses $T_i$ as a sending resource period, where i=1, 2, . . . , and K. In LTE-V, communication data sent by terminals is classified into P different types, and the types are $M_1, M_2, \ldots,$ and $M_P$ respectively. The network-side device configures corresponding sending resource periods for the communication data types respectively, and the periods are $N_1, N_2, \ldots,$ and $N_P$ respectively. That is, when a type of communication data sent by a terminal is $M_j$, $N_j$ is used as a sending resource period, where j=1, 2 . . . , and P.

If the network-side device configures a plurality of resource period parameters according to the priorities of the terminals and the types of the communication data sent by the terminals, the first terminal obtains, from the network-side device according to a priority of the first terminal, a resource period parameter corresponding to the priority; or the first terminal obtains, from the network-side device according to a type of the sent device-to-device communication data, a resource period parameter corresponding to the type of the device-to-device communication data. Therefore, different terminals or a same terminal can use different resource periods in different cases.

In S101, the period parameters configured by the network-side device for all resources may be the same or different, and a period duration of a resource may also be changed. For example, starting from a time T1, a period duration configured by the network-side device for a resource A is x ms; and starting from a time T2, a period duration configured by the network-side device for the resource A is changed to y ms. Specifically, the resource period duration may be adjusted according to different methods. A possible manner is to adjust period information according to period parameter adjustment instruction information sent by the first terminal.

Figure 14:
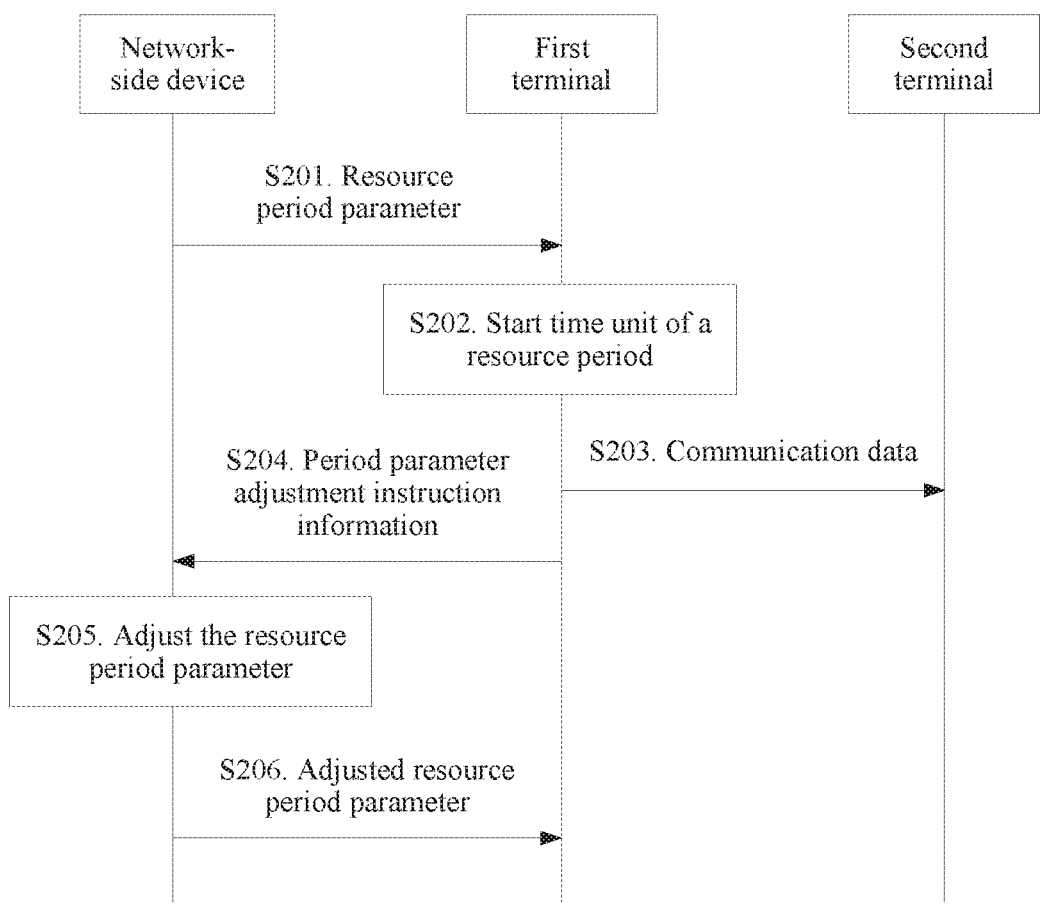
FIG. 14 is another schematic implementation flowchart of a communication method according to an embodiment of the present invention.

FIG. 14 is another implementation flowchart of a communication method according to an embodiment of the present invention.

In the implementation process of the method shown in FIG. 14, steps S201, S202, and S203 are respectively the same as steps S101, S102, and S103 in the implementation process of the method shown in FIG. 13. A difference lies in that the method in FIG. 14 further includes the following steps.

S204. The first terminal sends period parameter adjustment instruction information.

In this embodiment of the present invention, the period parameter adjustment instruction information sent by the first terminal may include resource load information of the first terminal, a latency requirement of a data packet, or the like. This is not limited.

S205. The network-side device receives the period parameter adjustment instruction information sent by the first terminal, and adjusts the resource period parameter according to the period parameter adjustment instruction information.

In this embodiment of the present invention, the network-side device may adjust the resource period parameter according to resource load of the first terminal. For example, if resource load in resource adjustment instruction information sent by the first terminal becomes heavier than that of a previous time, the network-side device may increase the resource period duration; or if resource load in resource adjustment instruction information sent by the first terminal becomes lighter than that of a previous time, the network-side device may reduce the resource period duration. For data packets with different latencies, similar adjustments may also be performed. For example, some data packets with high priorities need to be sent out as soon as possible to shorten the resource period.

S206. The network-side device sends a resource period parameter obtained after adjustment.

The network-side device sends the resource period parameter obtained after adjustment, and the first terminal may send data according to the resource period parameter obtained after adjustment.

In S102, when determining the start time unit of the resource period, the first terminal may use different determining manners according to a specific mode of the first terminal.

The first terminal may send the communication data in two modes. In one mode, the first terminal sends the communication data by using a time domain resource allocated by the network-side device to the first terminal. In the other mode, the terminal autonomously selects a time domain resource to send the communication data.

Figure 15:
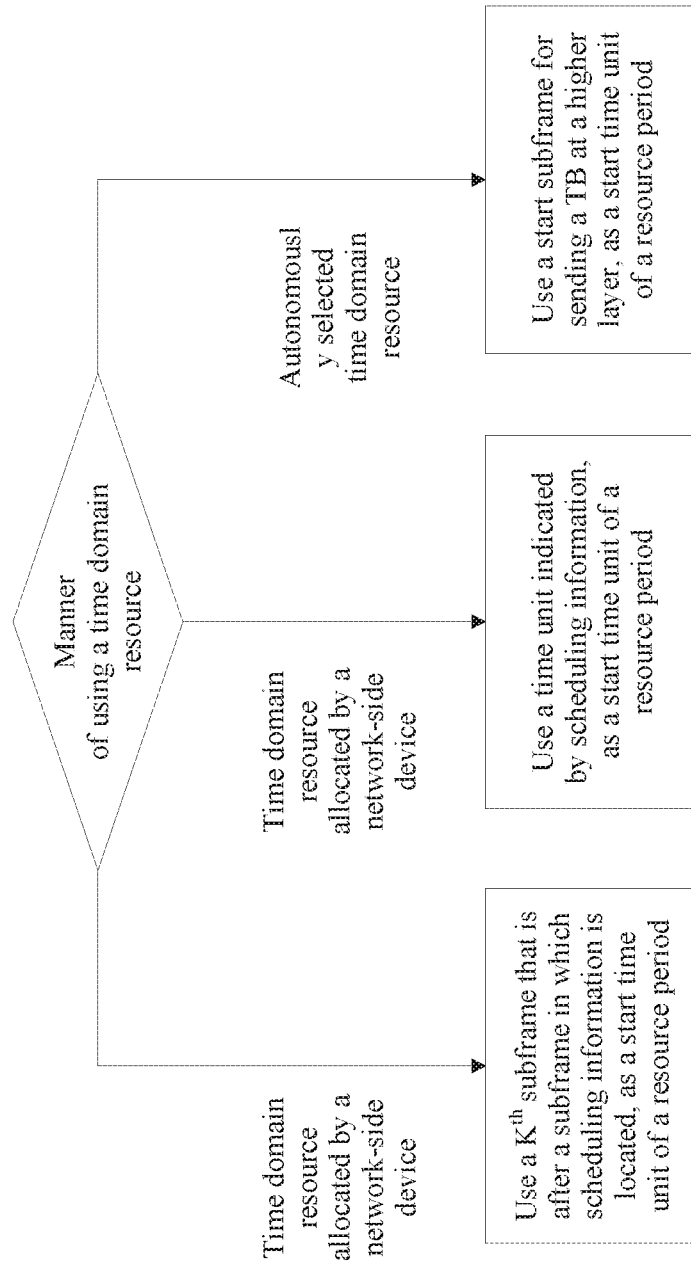
FIG. 15 is a schematic flowchart for determining a start time unit of a period of an available resource by a first terminal according to an embodiment of the present invention.

FIG. 15 is a schematic flowchart for determining a start time unit of a period of an available resource by a first terminal according to an embodiment of the present invention. As shown in FIG. 15, the first terminal determines a manner of using a time domain resource. When the first terminal autonomously selects a time domain resource for sending communication data, the communication data sent by the first terminal is sent at a bottom physical layer, and a start subframe for sending a transport block (TB) at a higher layer may be used as the start time unit of the period of the available resource.

When the first terminal sends communication data by using a time domain resource allocated by a network-side device, the start time unit of the period of the available resource may be determined in the following two manners:

Manner 1: The network-side device sends scheduling information (DCI) to the first terminal by using an air interface (a Uu interface), and the first terminal uses a $K^{th}$ sidelink subframe that is after a sidelink subframe corresponding to a subframe in which the scheduling information is received, as the start time unit of the period; or the first terminal uses a sidelink subframe corresponding to a $K^{th}$ subframe that is after a subframe in which the scheduling information is received, as the start time unit of the period; where K is a non-negative integer.

Manner 2: The network-side device sends scheduling information to the first terminal by using an air interface, where the scheduling information indicates the start time unit of the period of the first terminal; and the first terminal receives the scheduling information, and uses the time unit indicated by the scheduling information, as the start time unit of the period.

Because timings used between the network-side device and the first terminal and between the first terminal and the second terminal may be asynchronous, a system frame number (SFN) and a direct frame number (DFN) may be asynchronous. If the start time unit of the resource period is determined in the manner 1, because conversion between the SFN and the DFN is required, a fuzzy resource configuration problem caused by synchronous timings may occur. If the manner 2 is used, and the network-side device directly indicates the start time unit of the resource period, the foregoing fuzzy resource configuration problem can be avoided.

The first terminal may select, according to an actual situation, one of the foregoing two manners to determine the start time unit of the period of the available resource. In a possible implementation, before the first terminal determines the start time unit of the period, if the network-side device can obtain an offset between the system frame number (SFN) and the direct frame number (DFN), where the offset is obtained and sent by the first terminal to a network side, the manner 2 may be used, and the network-side device indicates, in the sent scheduling information, the start time unit of the period of the resource available to the first terminal.

In this embodiment of the present invention, the network-side device does not need to further send resource offset indication information to the terminal, and the terminal itself may determine the start time unit of the resource period according to the scheduling information. This can avoid the fuzzy resource configuration problem caused by a plurality of synchronous timings.

In S102, after determining the start time unit of the period of the available resource, the first terminal may send the communication data. When sending the communication data, the first terminal may send the communication data according to the period duration included in the obtained resource period parameter.

In this embodiment of the present invention, for convenience of receiving the data by the receiving terminal (the second terminal), the following possible implementations may be used.

In a possible implementation, when a plurality of resource periods are configured by the network-side device, on a basis of the implementation process of the method shown in FIG. 13 or FIG. 14, the method further includes: the first terminal determines a resource period used by the first terminal, and sends resource period indication information to the second terminal, that is, the first terminal indicates, to the second terminal, the resource period currently used by the first terminal, and the second terminal receives the communication data according to the resource period indicated by the first terminal, and determines a time domain resource position occupied by the communication data.

Figure 16:
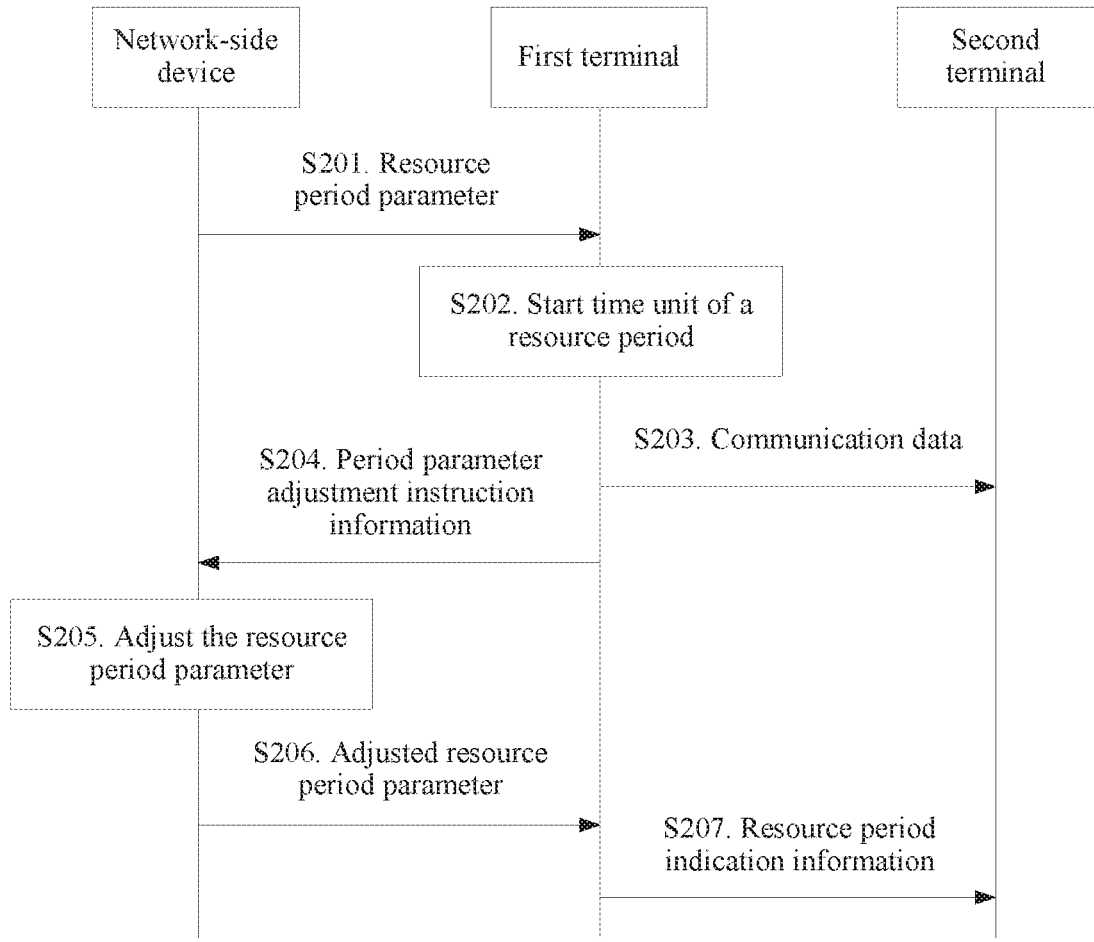
FIG. 16 is still another implementation flowchart of a communication method according to an embodiment of the present invention.

FIG. 16 is still another implementation flowchart of a device-to-device communication method according to an embodiment of the present invention. For illustration purposes, the implementation process of the method shown in FIG. 16 is described on a basis of the implementation process of the method shown in FIG. 14, that is, on the basis of the implementation process of the method shown in FIG. 14, the method further includes the following step.

S207. The first terminal sends resource period indication information to the second terminal.

The first terminal may send the resource period indication information in SA, and the resource period indication information may be a specific resource period duration, or may be an index value used for indicating a resource period duration.

In this embodiment of the present invention, positions for transmitting communication data each time in different resource periods may be represented by different bits. In this embodiment of the present invention, time domain transmission resource indication information is used to indicate a time domain resource position occupied every time to send the communication data in the resource period, and specifically a T-RPT field in SA of a D2D communications system may be used, but certainly, this is not limited. For example, an extension of a T-RPT, or index value information similar to a T-RPT may be used. Optionally, different resource period durations can be indicated by lengths of different bits in a time domain transmission resource indication information field. For example, various binary values corresponding to a time domain transmission resource indication information field whose length is a bits may be used to indicate a time domain resource position occupied every time to transmit communication data in a resource period indicated by resource period indication information, where a resource period duration is x ms.

The second terminal receives the resource period indication information sent by the first terminal.

In this embodiment of the present invention, the second terminal may obtain, by obtaining the SA of the first terminal, the resource period indication information sent by the first terminal. After receiving the resource period indication information sent by the first terminal, the second terminal may obtain a resource period used by the first terminal. According to the obtained resource period used by the first terminal, the length of the time domain transmission resource indication information field used for transmitting the communication data in the resource period may be determined, and the time domain resource position occupied every time to transmit the communication data in the resource period is parsed according to the length. For example, when the resource period duration indicated by the resource period indication information sent by the first terminal in the SA is x ms, the second terminal may learn that the length of the time domain transmission resource indication information field sent by the first terminal in the SA is a bits, and may further parse, according to the resource period whose resource period duration is x ms, a binary value indicating the a-bit time domain transmission resource indication information, to obtain the time domain resource position indicated by the time domain transmission resource indication information.

In this embodiment of the present invention, to enable the second terminal to obtain the time domain resource position of the communication data that the first terminal transmits every time in the used resource period, on a basis of the foregoing embodiment, the first terminal may further send the time domain transmission resource indication information to the second terminal, where the time domain transmission resource indication information is used to indicate the time domain resource position that is occupied every time to send the communication data in the resource period, and that is relative to the start time unit of the resource period. For example, in a schematic diagram of time domain transmission of communication data shown in FIG. 17, communication data A is sent once in a first subframe, a third subframe, a fifth subframe, and a seventh subframe separately in the resource period whose resource period duration is x ms, and is sent for four times in total. In this case, the time domain transmission resource indication information is used to indicate that the communication data A is sent in the first subframe, the third subframe, the fifth subframe, and the seventh subframe, relative to the start subframe of the resource period whose resource period duration is x ms. The first terminal may further send, to the second terminal, indication information used for the second terminal to determine an absolute position, in time domain transmission, of the time domain resource position indicated by the time domain transmission resource indication information. The indication information may be, for example, transmission sequence number indication information or period start point indication information. The period start point indication information is used to indicate the start time unit of the resource period, and the start time unit of the resource period is the absolute position in time domain transmission. The transmission sequence number indication information is used to indicate a transmission sequence number of the sent device-to-device communication data in the resource period. For example, the communication data A is sent once in the first subframe, the third subframe, the fifth subframe, and the seventh subframe separately in the resource period whose resource period duration is x ms; in this case, the transmission sequence number indication information may indicate that the communication data A is transmitted for the first time, the second time, the third time, or the fourth time.

Figure 17:
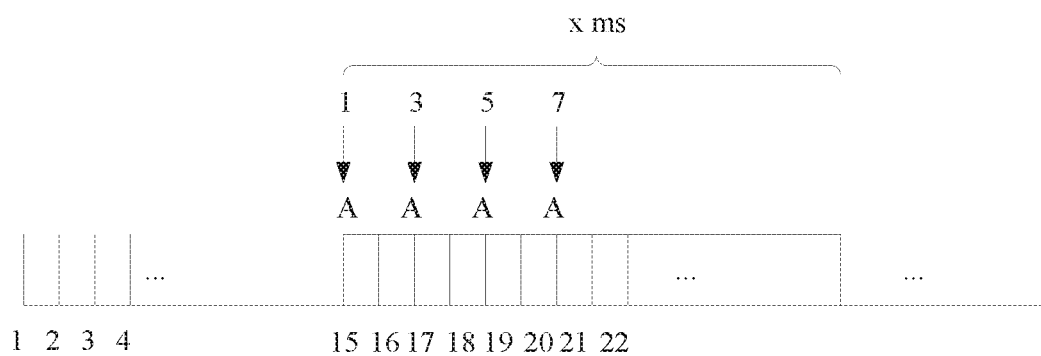
FIG. 17 is a schematic diagram of time domain transmission of communication data according to an embodiment of the present invention.

The start time unit of the resource period that is indicated by the period start point indication information is an absolute position of the time domain resource in time domain transmission, for example, a fifteenth subframe in FIG. 17. The time domain resource position indicated by the time domain resource indication information is a relative position. For example, the first subframe, the third subframe, the fifth subframe, and the seventh subframe that are indicated in the time domain transmission resource indication information are relative to the start time unit of the resource period whose resource period duration is x ms.

Figure 18A:
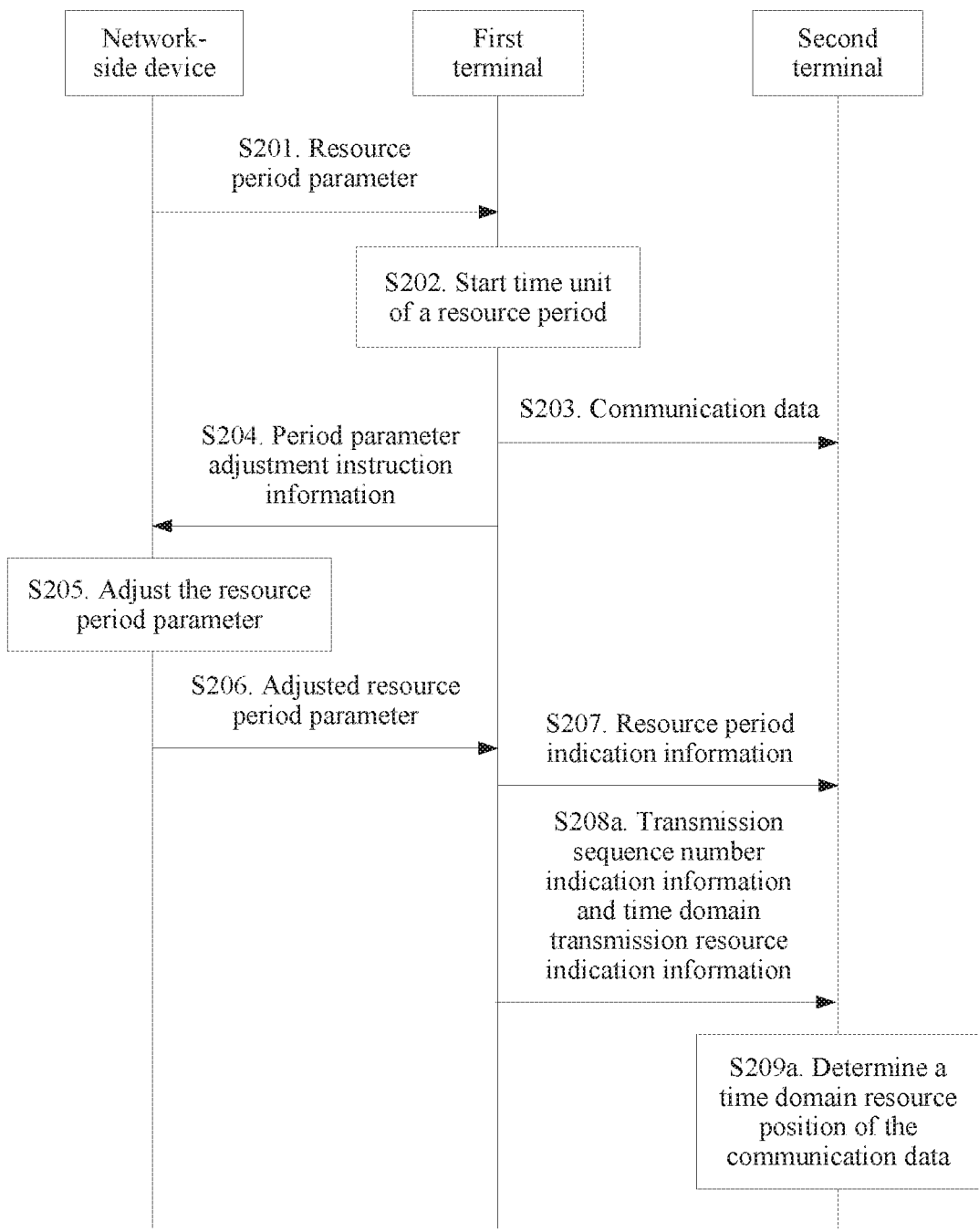
FIG. 18A and FIG. 18B are yet another implementation flowchart of a communication method according to an embodiment of the present invention.

FIG. 18A is yet another implementation flowchart of a device-to-device communication method according to an embodiment of the present invention. For illustration purposes, the implementation process of the method shown in FIG. 18A is described on a basis of the implementation process of the method shown in FIG. 16, but this is not limited. The implementation process of the method may also be based on the implementation process of the method shown in FIG. 13 or FIG. 14. On a basis of the implementation process of the method shown in FIG. 16, the method further includes the following steps.

S208a. The first terminal sends transmission sequence number indication information and time domain transmission resource indication information to the second terminal.

The first terminal may send the transmission sequence number indication information and the time domain transmission resource indication information in SA to the second terminal.

S209a. The second terminal determines a time domain resource position of the communication data according to the transmission sequence number indication information and the time domain transmission resource indication information.

The second terminal may obtain the SA of the first terminal, obtain, according to the SA, the time domain transmission resource indication information sent by the first terminal, and parse the time domain transmission resource indication information to obtain each relative position that is relative to the start time unit of the resource period and that is of currently received communication data that is transmitted for multiple times in the current resource period. For example, the currently obtained time domain transmission resource indication information indicates that current data transmitted each time is the communication data A in the first subframe, the third subframe, the fifth subframe, or the seventh subframe in the resource period whose resource period duration is x ms. The first terminal may further obtain, according to the SA, the transmission sequence number indication information sent by the first terminal, and parse the transmission sequence number indication information to obtain a transmission time at which the currently received communication data is transmitted in the current resource period. For example, for the communication data A in the first subframe in the resource period whose resource period duration is x ms, the parsed transmission sequence number indication information may indicate the first transmission time.

The second terminal may determine, with reference to the transmission sequence number indication information and the time domain transmission resource indication information, an absolute position of the currently received communication data in time domain transmission, that is, may determine a position of the fifteenth subframe shown in FIG. 17, and may further determine that the communication data A sent in the third subframe, the fifth subframe, and the seventh subframe in the resource period whose resource period duration is x ms is received in a seventeenth subframe, a nineteenth subframe, and a twenty-first subframe.

Figure 18B:
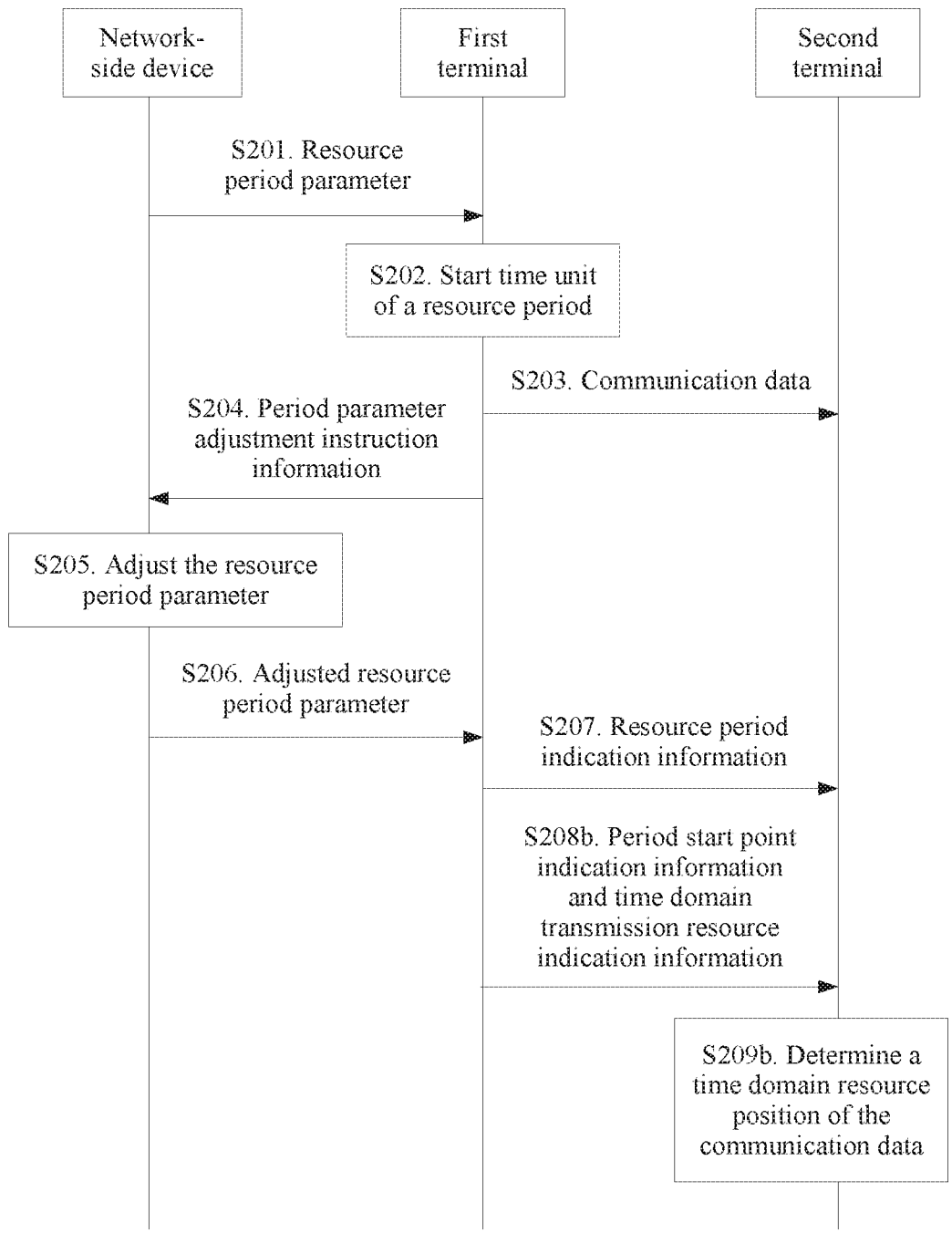

FIG. 18B is yet another implementation flowchart of a device-to-device communication method according to an embodiment of the present invention. For illustration purposes, the implementation process of the method shown in FIG. 18B is described on a basis of the implementation process of the method shown in FIG. 16, but this is not limited. The implementation process of the method may also be based on the implementation process of the method shown in FIG. 13 or FIG. 14. On a basis of the implementation process of the method shown in FIG. 16, the method further includes the following steps.

S208b. The first terminal sends period start point indication information and time domain transmission resource indication information to the second terminal.

The first terminal sends the period start point indication information and the time domain transmission resource indication information in SA to the second terminal.

S209b. The second terminal receives the period start point indication information and the time domain transmission resource indication information, and determines a time domain resource position of the communication data according to the period start point indication information and the time domain transmission resource indication information.

The second terminal may obtain, according to the SA, the time domain transmission resource indication information sent by the first terminal, and parse the time domain transmission resource indication information to obtain each relative position that is relative to the start time unit of the resource period and that is of currently received communication data that is transmitted for multiple times in the current resource period. For example, the currently obtained time domain transmission resource indication information indicates that current data transmitted each time is the communication data A in the first subframe, the third subframe, the fifth subframe, or the seventh subframe in the resource period whose resource period duration is x ms. The first terminal may further obtain the period start point indication information sent by the first terminal, and may parse the period start point indication information to obtain the start subframe of the resource period of the currently received communication data, for example, in FIG. 17, for the resource period whose resource period duration is x ms, may determine that the start subframe of the resource period is a fifteenth frame.

The second terminal may determine, with reference to the period start point indication information and the time domain transmission resource indication information, an absolute position of the currently received communication data in time domain transmission, that is, may determine a position of a seventeenth frame shown in FIG. 17, and may further determine that the communication data A sent in the first subframe, the fifth subframe, and the seventh subframe in the resource period whose resource period duration is x ms is received in the fifteenth frame, a nineteenth frame, and a twenty-first frame.

In this embodiment of the present invention, the first terminal sends the transmission sequence number indication information and the time domain transmission resource indication information to the second terminal, or sends the period start point indication information and the time domain transmission resource indication information to the second terminal, so that the second terminal obtains the absolute position of the communication data that the first terminal transmits every time in the resource period in time domain transmission.

Specifically, the first terminal sends the period start point indication information or the transmission sequence number indication information, generally indicated by a binary value. For the transmission sequence number indication information, for example, if each piece of data is transmitted for four times, the transmission sequence number indication information may be indicated by two bits, namely, 00, 01, 10, and 11; or if each piece of data is transmitted twice, the transmission sequence number indication information may be indicated by one bit, namely, 0 and 1. For the period start point indication information, generally, more positions of the start time unit of the resource period are indicated by the period start point indication information, and more bits are required for indicating the positions. However, in one resource period, a quantity of transmission times may be relatively small, and therefore, a manner of sending the transmission sequence number indication information is used, and fewer bits may be used.

Figure 19:
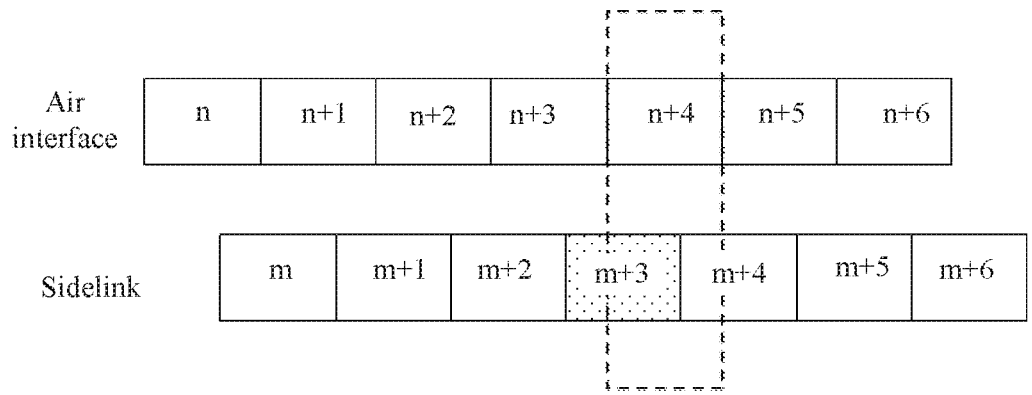
FIG. 19 is a schematic diagram in which a boundary of a Uu interface subframe is not aligned with a boundary of a sidelink subframe according to an embodiment of the present invention.

In this embodiment of the present invention, in a frequency division duplex (FDD) mode, because synchronization sources used by a Uu interface subframe and a sidelink subframe are different, boundaries of the Uu interface subframe and the sidelink subframe may not be aligned, and therefore, a correspondence between the Uu interface subframe and the sidelink subframe cannot be determined. For example, on the Uu interface, an eNB is used as a synchronization source, but on the sidelink, a global navigation satellite system (GNSS) is used as a synchronization source. Consequently, boundaries of the Uu interface subframe and the sidelink subframe may not be aligned, as shown in FIG. 19. In FIG. 19, a subframe with a sequence number n+4 on the Uu interface crosses two sidelink subframes whose sequence numbers are respectively m+3 and m+4 on the sidelink; and as a result, boundaries of the Uu interface subframe and the sidelink subframe are not aligned. In this case, the first terminal cannot determine whether the subframe with the sequence number n+4 on the Uu interface should correspond to the subframe with the sequence number m+3 or the subframe with the sequence number m+4 on the sidelink, and therefore cannot determine which subframe on the sidelink is determined as the start unit of the resource period.

In this embodiment of the present invention, in a time division duplex (TDD) mode, the system uses different timeslots of a frequency carrier to send and receive information, and may semi-statically adjust an uplink-downlink configuration according to different service types to satisfy an asymmetric uplink-downlink service requirement. For example, in a 3rd Generation Partnership Project (3GPP) LTE system, seven uplink-downlink configurations may be included, as shown in Table 1, where "D" represents a downlink subframe, "U" represents an uplink subframe, "S" represents a special subframe, and the special subframe may be used for downlink transmission.

TABLE 1

| Uplink-downlink configuration sequence number | Repetition period | Subframe sequence number in a radio frame | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In a communication scenario of direct communication between two devices, the Uu interface uses the TDD mode, and only some time units may be used for downlink transmission. For example, in Table 1, in an uplink-downlink configuration 0, only subframes with sequence numbers 0, 1, 5, and 6 may be used for downlink transmission, and the network-side device may send DCI in the subframes to the first terminal. However, on the sidelink, a dedicated carrier mode is used, and all subframes may be used for transmitting data. Therefore, quantities on the Uu interface and the sidelink do not match. If DCI in a subframe on the Uu interface can schedule only one subframe on the sidelink fixedly, some time units on the sidelink cannot be scheduled and therefore cannot be used for sending data, causing a waste of resources.

Regardless of whether the TDD mode or the FDD mode is used, in this embodiment of the present invention, when the first terminal determines the start time unit of the resource period, if the first terminal determines, according to the correspondence between the Uu interface subframe and the sidelink subframe, the sidelink subframe as the start time unit of the resource period, there is a disadvantage that the sidelink subframe cannot be uniquely determined.

In this embodiment of the present invention, for ease of description, hereinafter the Uu interface subframe is referred to as a Uu interface time unit, and the sidelink subframe is referred to as a sidelink time unit.

To avoid the foregoing disadvantage, in this embodiment of the present invention, the network-side device may send time unit indication information to the first terminal, where the time unit indication information is used to indicate a correspondence between a Uu interface time unit and a sidelink time unit, that is, the time unit indication information is used to indicate the specific sidelink time unit corresponding to the Uu interface time unit; and the first terminal may determine, according to the time unit indication information after receiving the time unit indication information, the specific sidelink time unit corresponding to the Uu interface time unit, and use the determined sidelink time unit as the start time unit of the resource period.

In the following embodiment of the present invention, a process of determining a sidelink time unit according to a Uu interface time unit is mainly described.

Figure 20:
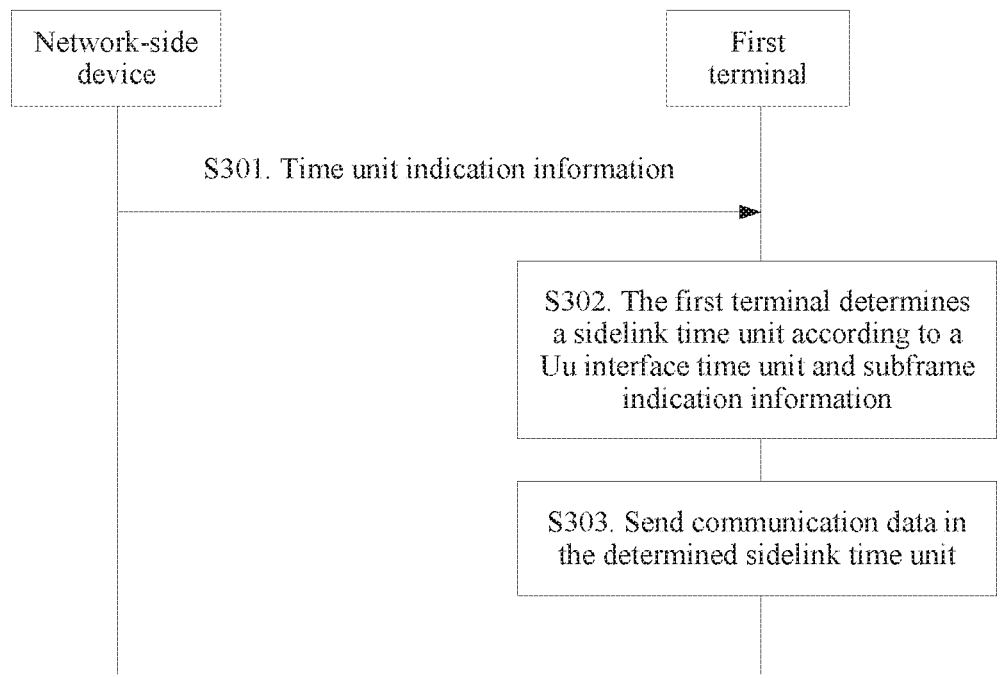
FIG. 20 is an implementation flowchart for determining a sidelink time unit according to an embodiment of the present invention.

FIG. 20 is an implementation flowchart for determining a sidelink time unit according to an embodiment of the present invention. As shown in FIG. 20, the process includes the following steps.

S301. A network-side device sends time unit indication information, where the time unit indication information is used to indicate a correspondence between a Uu interface time unit and a sidelink time unit.

In this embodiment of the present invention, the network-side device sends the time unit indication information in a Uu interface time unit to a first terminal.

S302. A first terminal receives the time unit indication information, and the first terminal determines the sidelink time unit according to the Uu interface time unit and the time unit indication information.

The first terminal receives the time unit indication information in the Uu interface time unit.

S303. The first terminal sends communication data in the sidelink time unit.

In this embodiment of the present invention, the first terminal may use the determined sidelink time unit as a start time unit of a resource period.

Generally, a sidelink time unit corresponding to a $K^{th}$ time unit that is after a time unit in which scheduling information is sent on a Uu interface may be used as the start time unit of the resource period of the first terminal. A value of K may be a fixed value. For example, the value of K is 4. The value of K may also be sent by the network-side device to the first terminal, and the network-side device may send the value of K to the first terminal by using scheduling information. In addition, the value of K sent by the network-side device to the first terminal every time may be the same or may be different.

Figure 21:
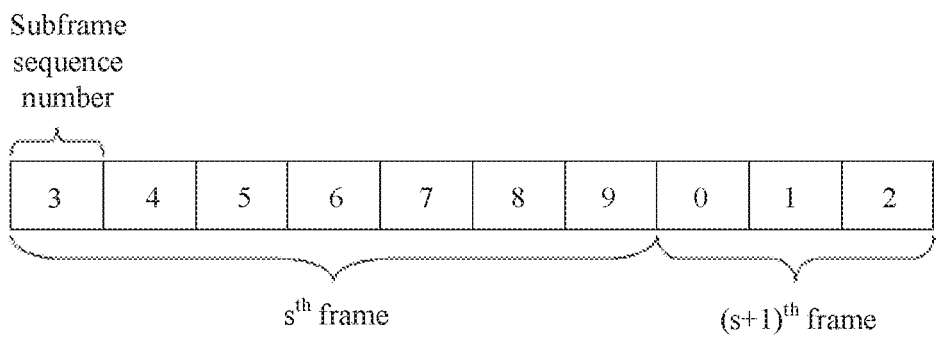
FIG. 21 is a schematic diagram in which a subframe n+k crosses a frame boundary according to an embodiment of the present invention.

It should be noted that, because each frame includes a fixed quantity of time units, for example, each frame in an LTE network includes 10 time units, and time unit sequence numbers of the 10 time units are 0 to 9, in this embodiment of the present invention, a $K^{th}$ time unit that is after an $n^{th}$ time unit in which scheduling information is sent may cross a frame boundary; and if the frame boundary is crossed, a remainder obtained after the time unit sequence number is divided by 10 needs to be used as a time unit sequence number. For example, if a sequence number n of the time unit for sending the scheduling information is 8, n+6=14, which is greater than 9, and a frame boundary is crossed. In this case, a remainder 4 obtained after 14 is divided by 10 needs to be used as the time unit sequence number, as shown in FIG. 21.

The following describes a specific implementation process of indicating the correspondence between the Uu interface time unit and the sidelink time unit by using the time unit indication information in this embodiment of the present invention.

In this embodiment of the present invention, one or more of the following implementations may be used to indicate the correspondence between the Uu interface time unit and the sidelink time unit by using the time unit indication information.

Implementation 1: Indicate, by using the time unit indication information, one of two sidelink time units that temporally overlap the $K^{th}$ Uu interface time unit that is after the Uu interface time unit, where K is a positive integer. In other words, two sidelink time units that are on a sidelink and whose boundaries are not aligned with a boundary of the Uu interface time unit are distinguished by using the time unit indication information.

In this embodiment of the present invention, the first terminal determines, according to the time unit indication information, one sidelink time unit in the two sidelink time units that temporally overlap the $K^{th}$ Uu interface time unit that is after the Uu interface time unit, as the sidelink time unit.

In this embodiment of the present invention, the time unit indication information may be sent by using scheduling information. A bit is set in the scheduling information sent by the network-side device and is used to indicate the time unit indication information. Two different sidelink time units that are on the sidelink and whose boundaries are not aligned with the boundary of the Uu interface time unit are indicated by using a value of the bit indicating the time unit indication information.

In this embodiment of the present invention, the indicating one of two sidelink time units by using the time unit indication information includes but is not limited to the following manners:

Manner 1: Indicate one sidelink time unit whose sequence number is an odd number (or an even number) and that is of the two sidelink time units; when the value of the bit indicating the time unit indication information is 0, indicate that a time unit whose sequence number is n+K on the Uu interface corresponds to a time unit whose sequence number is an odd (or even) number on the sidelink; or when the value of the bit indicating the time unit indication information is 1, indicate that a time unit whose sequence number is n+K on the Uu interface corresponds to a time unit whose sequence number is an even (or odd) number on the sidelink.

Manner 2: Indicate one sidelink time unit whose sequence number is smaller (or greater) and that is of the two sidelink time units; when the value of the bit indicating the time unit indication information is 0, indicate that the Uu interface time unit corresponds to a time unit whose sequence number is smaller (or greater) on the sidelink; or when the value of the bit indicating the time unit indication information is 1, indicate that the Uu interface time unit corresponds to a time unit whose sequence number is greater (or smaller) on the sidelink.

Manner 3: Indicate one sidelink time unit whose time is earlier (or later) and that is of the two sidelink time units; when the value of the bit indicating the time unit indication information is 0, indicate that the Uu interface time unit corresponds to a time unit whose time is earlier (or later) on the sidelink; or when the value of the bit indicating the time unit indication information is 1, indicate that the Uu interface time unit corresponds to a time unit whose time is later (or earlier) on the sidelink.

Manner 4: Indicate one sidelink time unit whose sequence number is an odd number (or an even number) and that is of the two sidelink time units corresponding to a time unit whose sequence number is an odd number or (an even number) on the Uu interface; when the value of the bit indicating the time unit indication information is 0, indicate that a time unit whose sequence number is an odd number on the Uu interface corresponds to a time unit whose sequence number is an odd (or even) number on the sidelink, and/or that a time unit whose sequence number is an even number on the Uu interface corresponds to a time unit whose sequence number is an even (or odd) number on the sidelink; or when the value of the bit indicating the time unit indication information is 1, indicate that a time unit whose sequence number is an odd number on the Uu interface corresponds to a time unit whose sequence number is an even (or odd) number on the sidelink, and/or that a time unit whose sequence number is an even number on the Uu interface corresponds to a time unit whose sequence number is an odd (or even) number on the sidelink.

After the first terminal receives, in the Uu interface time unit n, the scheduling information sent by the network-side device, the first terminal may determine the correspondence between the Uu interface time unit and the sidelink time unit according to the time unit indication information included in the scheduling information, and may further determine the specific sidelink time unit corresponding to the Uu interface time unit.

The foregoing manner 3 and a case in which boundaries of a sidelink time unit and a Uu interface time unit are not aligned as shown in FIG. 19 are used as examples. In FIG. 19, a time unit whose sequence number is n+4 on the Uu interface temporally overlaps time units whose sequence numbers are m+3 and n+4 on the sidelink. The first terminal receives, in a time unit whose sequence number is n on the Uu interface, scheduling information sent by the network-side device, where the scheduling information includes a bit used to indicate time unit indication information. In this case, the first terminal may determine, according to a value of the bit indicating the time unit indication information, a sidelink time unit indicated by the time unit indication information. If the value of the bit indicating the time unit indication information is 0, the first terminal determines a time unit that is temporally earlier on the sidelink and whose sequence number is m+3, as a finally determined sidelink time unit. If the value of the bit is 1, the first terminal determines a time unit that is temporally later on the sidelink and whose sequence number is m+4, as a finally determined sidelink time unit.

In this embodiment of the present invention, the foregoing specific indication manner of indicating, by using the value of the bit of the time unit indication information, two different sidelink time units that temporally overlap the Uu interface time unit, may be preconfigured on the first terminal, or may be configured by the network-side device for the first terminal by using one or more of system information, dedicated RRC information, Media Access Control (MAC) layer signaling, or physical layer signaling.

Further, in this embodiment of the present invention, specific indication manners on different first terminals may be different. For example, for a first terminal 1, when a value of a bit of time unit indication information is 0, a time unit whose time is earlier is indicated; or when a value of a bit of time unit indication information is 1, a time unit whose time is later is indicated. For a first terminal 2, when a value of a bit of time unit indication information is 0, a time unit whose sequence number is an odd number is indicated; or when a value of a bit of time unit indication information is 1, a time unit whose sequence number is an even number is indicated. In addition, indication manners on a first terminal in different time periods may also be different. For example, in a time period, for the first terminal 1, when the value of the bit of the time unit indication information is 0, a time unit whose time is earlier is indicated; or when the value of the bit of the time unit indication information is 1, a time unit whose time is later is indicated; In another time period, for the first terminal 1, when the value of the bit of the time unit indication information is 0, a time unit whose sequence number is an odd number is indicated; or when the value of the bit of the time unit indication information is 1, a time unit whose sequence number is an even number is indicated.

Implementation 2: Indicate a time unit sequence number in a frame on a sidelink by using the time unit indication information.

The first terminal uses a sidelink time unit corresponding to the time unit sequence number on the sidelink as the sidelink time unit; where a time of the sidelink time unit corresponding to the time unit sequence number is later than that of the Uu interface time unit.

Generally, each frame includes a fixed quantity of time units with time unit sequence numbers. For example, in the LTE network, every 10 time units form a frame, and time unit sequence numbers are 0 to 9. Therefore, in this embodiment of the present invention, a bit representing the time unit indication information may be set in the scheduling information sent by the network-side device, and a time unit sequence number in a frame on the sidelink is indicated by using a value of the bit representing the time unit indication information. For example, a frame includes 10 time units, and in the frame, time unit sequence numbers indicated by the time unit indication information are 0 to 9.

In this embodiment of the present invention, all or some time unit sequence numbers on the sidelink may be indicated by using values of bits representing the time unit indication information. The following describes two indication manners separately.

Manner 1: Indicate all time unit sequence numbers in a frame on the sidelink by using the values of the bits representing the time unit indication information.

In this embodiment of the present invention, four bits may be set in the scheduling information sent by the network-side device and are used to indicate the time unit indication information, and time unit sequence numbers 0 to 9 on the sidelink are indicated by using the four bits indicating the time unit indication information. For example, 0000 indicates a time unit sequence number 0, 0001 indicates a time unit sequence number 1, and so on, and 1001 indicates a time unit sequence number 9. Certainly, the foregoing correspondence between a bit value and a time unit sequence number is not limited in this embodiment of the present invention, and other correspondences may also exist.

In this embodiment of the present invention, the values of the four bits indicating the time unit indication information can indicate all time unit sequence numbers on the sidelink. Therefore, the time unit indication information may be used to indicate a sequence number of a sidelink time unit used as the start time unit of the resource period of the first terminal. In this embodiment of the present invention, the sidelink time unit indicated as the start time unit of the resource period of the first terminal may be a sidelink time unit whose boundary overlaps the boundary of the Uu interface time unit, or may be a sidelink time unit different from a sidelink time unit whose boundary overlaps the boundary of the Uu interface time unit. The indication manners are flexible.

Figure 22:
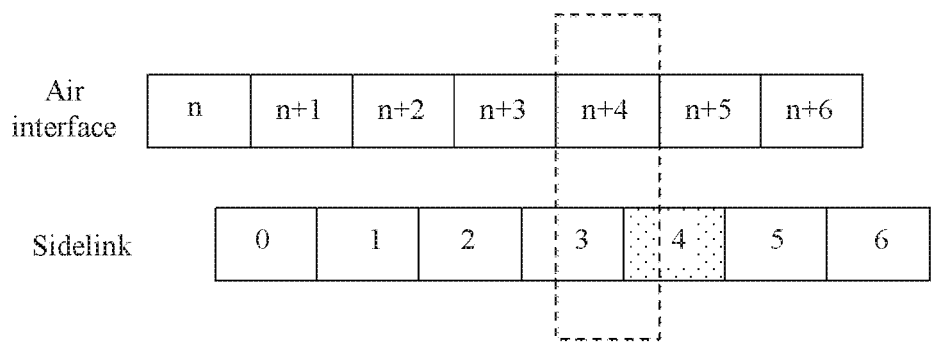
FIG. 22 is a schematic diagram 1 of time unit indication information indicating a Uu interface time unit and a sidelink time unit according to an embodiment of the present invention.

For example, in FIG. 22, the first terminal receives, in a time unit whose sequence number is n on the Uu interface, scheduling information sent by the network-side device, where the scheduling information includes four bits indicating time unit indication information, and a Uu interface time unit n+4 crosses time units whose time unit sequence numbers are 3 and 4 on the sidelink. If a sidelink time unit sequence number indicated by a value of the four bits indicating the time unit indication information is 4, the first terminal may determine, according to the time unit indication information, that a Uu interface time unit n+4 corresponds to the sidelink time unit whose time unit sequence number is 4, and may further use the sidelink time unit whose time unit sequence number is 4 as the start time unit of the resource period.

Figure 23:
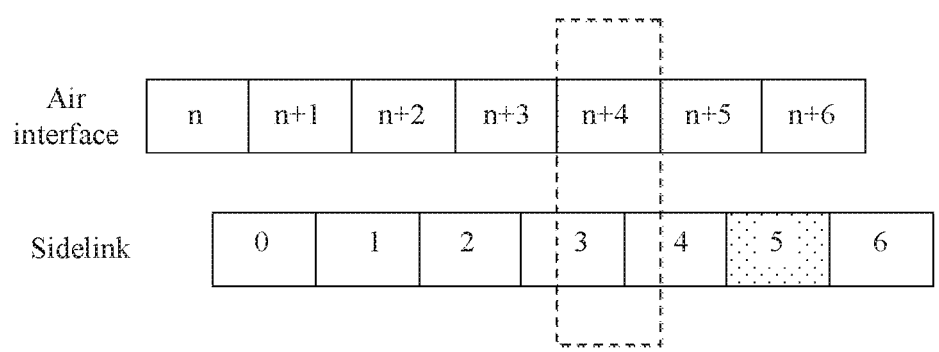
FIG. 23 is a schematic diagram 2 of time unit indication information indicating a Uu interface time unit and a sidelink time unit according to an embodiment of the present invention.

For another example, in FIG. 23, the first terminal receives, in a time unit whose sequence number is n on the Uu interface, scheduling information sent by the network-side device, where the scheduling information includes four bits indicating time unit indication information, and a Uu interface time unit n+4 temporally overlaps time units whose time unit sequence numbers are 3 and 4 on the sidelink. If a sidelink time unit sequence number indicated by a value of the four bits indicating the time unit indication information is 5, the first terminal may determine, according to the time unit indication information, that a Uu interface time unit n+4 corresponds to the sidelink time unit whose time unit sequence number is 5, and may further use the sidelink time unit whose time unit sequence number is 5 as the start time unit of the resource period.

Manner 2: Indicate some time unit sequence numbers in a frame on the sidelink by using values of bits representing the time unit indication information.

In this embodiment of the present invention, two or three bits may be set in the scheduling information sent by the network-side device and are used to indicate the time unit indication information, and some sidelink time units whose time unit sequence numbers are 0 to 9 are indicated by using the two or three bits indicating the time unit indication information. For example, three bits are set in the scheduling information and are used to indicate the time unit indication information. In this case, values of the three bits indicating the time unit indication information may indicate eight time units in time units whose sequence numbers are 0 to 9, for example, may indicate time unit sequence numbers 0 to 7 (or may indicate other time unit sequence numbers, such as 1 to 8 or 2 to 9). 000 indicates a time unit sequence number 0, 001 indicates a time unit sequence number 1, and so on, and 111 indicates a time unit sequence number 7. Certainly, the foregoing correspondence between a bit value and a time unit sequence number is not limited in this embodiment of the present invention, and other correspondences may exist.

Figure 24:
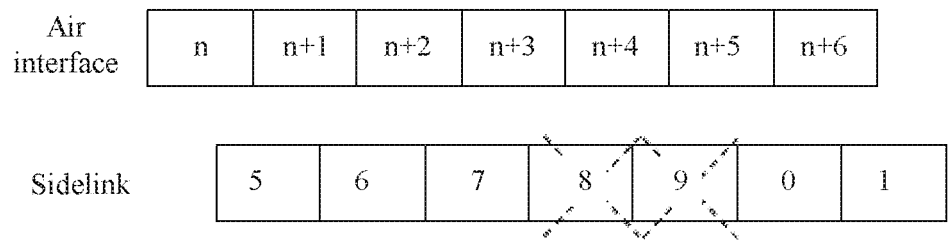
FIG. 24 is a schematic diagram 3 of a Uu interface time unit and a sidelink time unit according to an embodiment of the present invention.

In this embodiment of the present invention, an implementation of indicating some time units sequence numbers on the sidelink by using values of bits representing the time unit indication information is similar to an implementation of indicating all time unit sequence numbers on the sidelink by using values of bits representing the time unit indication information, and a difference lies only in that the time unit indication information cannot indicate all time unit sequence numbers. As shown in FIG. 24, 3-bit time unit indication information is used to indicate time unit sequence numbers 0 to 7, and time units whose time unit sequence numbers are 8 and 9 cannot be indicated. Details are not described again herein.

Compared with indicating all time unit sequence numbers on the sidelink by using values of bits representing the time unit indication information, the implementation of indicating some time unit sequence numbers on the sidelink by using values of bits representing the time unit indication information can save bits.

In this embodiment of the present invention, the time unit indication information is indicated by more than one bit. Therefore, the time unit indication information can directly indicate a time unit sequence number on the sidelink. The indicated sidelink time unit is not limited to a time unit that overlaps a time unit on the Uu interface. A range of indicated sidelink time units is wider, and flexibility is also higher.

In this embodiment of the present invention, the foregoing manner of indicating the sidelink time unit by using the time unit indication information of more than one bit may be preconfigured on the first terminal, or may be configured by the network-side device for the first terminal by using one or more of system information, dedicated RRC information, MAC layer signaling, or physical layer signaling.

Further, in this embodiment of the present invention, specific indication manners on different first terminals may be different. For example, for a first terminal 1, time unit indication information indicated by three bits indicates sidelink time units whose time unit sequence numbers are 0 to 7. For a first terminal 2, time unit indication information indicated by three bits indicates sidelink time units whose time unit sequence numbers are 1 to 8. In addition, indication manners on a first terminal in different time periods may also be different. For example, in a time period, for the first terminal 1, time unit indication information indicated by three bits indicates sidelink time units whose time unit sequence numbers are 0 to 7, but in another time period, for the first terminal 1, time unit indication information indicated by three bits indicates sidelink time units whose time unit sequence numbers are 1 to 8.

Implementation 3: Indicate a difference between a Uu interface time unit sequence number and a sidelink time unit sequence number by using the time unit indication information, so that the terminal device determines a sidelink time unit according to the difference.

Figure 25:
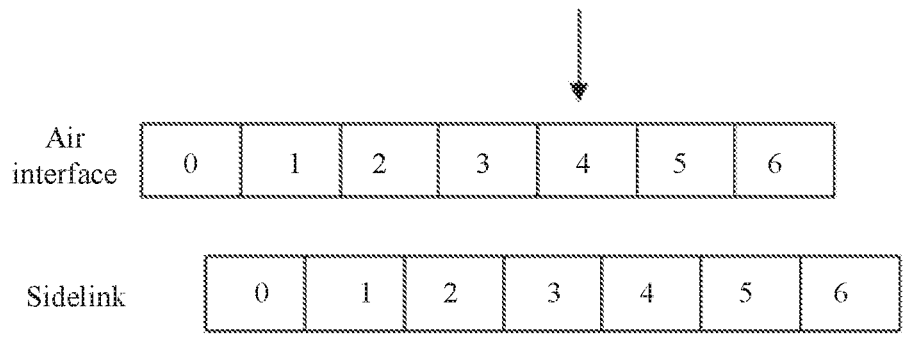
FIG. 25 is a schematic diagram 4 of time unit indication information indicating a Uu interface time unit and a sidelink time unit according to an embodiment of the present invention.

In this embodiment of the present invention, the network-side device may indicate a difference between a time unit sequence number of a $K^{th}$ time unit that is after an $n^{th}$ time unit in which scheduling information is sent on the Uu interface and a sidelink time unit sequence number by using the time unit indication information. For example, as shown in FIG. 25, the first terminal receives the scheduling information in a time unit whose time unit sequence number is 4 on the Uu interface. If the difference, indicated by the time unit indication information included in the scheduling information, between the time unit sequence number of the $K^{th}$ time unit that is after the $n^{th}$ time unit in which the scheduling information is sent on the Uu interface and the sidelink time unit sequence number is 0, the first terminal may determine that the time unit whose time unit sequence number is 4 on the Uu interface corresponds to a sidelink time unit whose sequence number is 4 on the sidelink. If the difference, indicated by the time unit indication information included in the scheduling information, between the time unit sequence number of the $K^{th}$ time unit that is after the $n^{th}$ time unit in which the scheduling information is sent on the Uu interface and the sidelink time unit sequence number is 1, the first terminal may determine that the time unit whose time unit sequence number is 4 on the Uu interface corresponds to a sidelink time unit whose sequence number is 3 on the sidelink.

In this embodiment of the present invention, the difference, indicated by the time unit indication information, between the time unit sequence number of the $K^{th}$ time unit that is after the $n^{th}$ time unit in which the scheduling information is sent on the Uu interface and the sidelink time unit sequence number indicates the sidelink time unit. The indicated sidelink time unit is not limited to a time unit that overlaps a time unit on the Uu interface. A range of indicated sidelink time units is wider, and flexibility is also higher.

It should be noted that, the foregoing time unit indication information indicates that the time unit n+K on the Uu interface corresponds to the sidelink time unit sequence number. This is used as an example for description. However, this embodiment of the present invention is not limited to indicating the sidelink time unit sequence number corresponding to the time unit n+K. The time unit indication information may also indicate that a fixed time unit on the Uu interface corresponds to the sidelink time unit sequence number, for example, indicate that a time unit whose sequence number is 0 on the Uu interface corresponds to the sidelink time unit sequence number. A sequence number of the fixed time unit may be fixed or variable, or may be preconfigured, or may be notified by an eNB to sending UE by using system information, dedicated RRC signaling, MAC layer signaling, physical (PHY) layer signaling, or the like.

Manner 4: Indicate, by using the time unit indication information, at least one of at least one sidelink time unit indicated by time unit scheduling correspondence information.

In this embodiment of the present invention, the time unit scheduling correspondence information is used to indicate at least one sidelink time unit corresponding to the Uu interface time unit. The first terminal device can determine, according to the Uu interface time unit and the time unit scheduling information, the at least one sidelink time unit corresponding to the Uu interface time unit in which the time unit indication information is received; and use the at least one sidelink time unit that is indicated by the time unit indication information, and that is of the at least one sidelink time unit corresponding to the Uu interface time unit, as the sidelink time unit that is finally required.

In this embodiment of the present invention, the Uu interface time unit may be the Uu interface time unit in which the network device sends the scheduling information. For example, using a configuration 6 in Table 1 as an example, time units that may be used for downlink transmission are 0, 1, 5, 6, and 9. At least one sidelink time unit corresponding to the Uu interface time unit may be the at least one sidelink time unit indicated by the time unit scheduling correspondence information as shown in Table 2. For example, a time unit whose sequence number is 0 on the Uu interface corresponds to a time unit whose sequence number is 4 and/or 5 on the sidelink. A time unit whose sequence number is 1 on the Uu interface corresponds to a time unit whose sequence number is 6 and/or 7 on the sidelink. The scheduling information sent by the network-side device in the time unit whose sequence number is 0 on the Uu interface may be used to schedule the first terminal to send data in the time unit whose sequence number is 4 and/or 5 on the sidelink. The scheduling information sent by the network-side device in the time unit whose sequence number is 1 on the Uu interface may be used to schedule the first terminal to send data in the time unit whose sequence number is 6 and/or 7 on the sidelink.

TABLE 2

|  | Uu interface time unit sequence number | | | | |
| --- | --- | --- | --- | --- | --- |
|  | 0 | 1 | 5 | 6 | 9 |
| Sidelink time unit sequence number | 4, 5 | 6, 7 | 8, 9 | 0, 1 | 2, 3 |

In this embodiment of the present invention, the time unit scheduling correspondence information may be predefined in a system or configured by the network-side device. When configured by the network-side device, the time unit scheduling correspondence information may be transmitted by using at least one of system information or dedicated RRC signaling.

In this embodiment of the present invention, the implementation in which the time unit indication information indicates at least one of at least one sidelink time unit indicated by time unit scheduling correspondence information is similar to the implementation of indicating one of two sidelink time units that temporally overlap the $K^{th}$ Uu interface time unit that is after the Uu interface time unit in the foregoing manner 1, manner 2, and manner 3, and a difference lies only in indicating at least one of at least one sidelink time unit. For a specific implementation, refer to the implementation in the foregoing manner 1, manner 2, and manner 3. Details are not described again herein.

For example, the network-side device sends the scheduling information to the first terminal on a Uu interface whose sequence number is n, and the scheduling information includes the time unit indication information. The first terminal determines, according to the Uu interface time unit and the time unit scheduling information, the at least one sidelink time unit corresponding to the Uu interface time unit, and uses the at least one sidelink time unit that is indicated by the time unit indication information, and that is of the at least one sidelink time unit corresponding to the Uu interface time unit, as the sidelink time unit. For example, the first terminal receives the scheduling information sent by the network-side device in the Uu interface time unit whose sequence number is 0, and may determine, according to the Uu interface time unit whose sequence number is 0 and the time unit scheduling correspondence information shown in Table 2, that the Uu interface time unit whose sequence number is 0 corresponds to the sidelink time units whose sequence numbers are 4 and 5 on the sidelink. The first terminal determines one or more sidelink time units according to the time unit indication information in the scheduling information. For example, the time unit indication information indicates one time unit whose sequence number is an odd number and that is of the two time units, and therefore indicates the time unit whose sequence number is 5 on the sidelink. The terminal device sends the communication data in the determined sidelink time unit.

Manner 5: Indicate, by using the time unit indication information, a sidelink time unit corresponding to a $K^{th}$ time unit that is after a Uu interface time unit in which the time unit indication information is received, so that the first terminal uses the sidelink time unit corresponding to the $K^{th}$ time unit that is after the Uu interface time unit as a final sidelink time unit used for sending the communication data.

Figure 26:
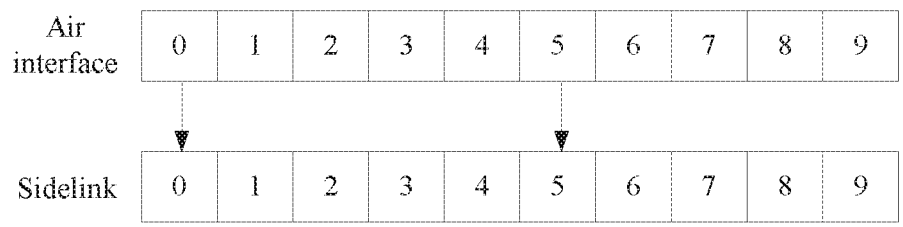
FIG. 26 is a schematic diagram 5 of time unit indication information indicating a Uu interface time unit and a sidelink time unit according to an embodiment of the present invention.

Further, in a TDD mode, a Uu interface time unit used for downlink data transmission on the Uu interface may be used for scheduling a sidelink time unit with a specified sequence number on the sidelink. However, because a quantity of Uu interface time units used for downlink data transmission on the Uu interface does not match a quantity of sidelink time units on the sidelink, some time units on the sidelink cannot be scheduled. For example, in FIG. 26, only Uu interface time units whose sequence numbers are 0, 1, 5, 6, and 9 can schedule corresponding sidelink time units whose sequence numbers are 0, 1, 5, 6, and 9 on the sidelink. However, as shown in FIG. 26, there are correspondences between the Uu interface time units (including a Uu interface time unit used for uplink transmission, a Uu interface time unit used for downlink transmission, and a special time unit) and the sidelink time units. Therefore, in this embodiment of the present invention, the time unit indication information may be used to indicate that the sidelink time unit corresponding to the $K^{th}$ time unit that is after the Uu interface time unit in which the time unit indication information is received is used as the final sidelink time unit used for sending the communication data.

For example, in FIG. 26, the first terminal sends the time unit indication information in the Uu interface time unit whose sequence number is 0; and according to the Uu interface time unit whose sequence number is 0 and the time unit indication information, the first terminal determines a sidelink time unit on the sidelink corresponding to a $K^{th}$ time unit that is after the Uu interface time unit whose sequence number is 0 on the Uu interface. For example, the time unit indication information indicates that K is 5. In this case, the first terminal determines that the sidelink time unit corresponding to the time unit whose sequence number is 5 on the Uu interface is the sidelink time unit whose sequence number is 5 on the sidelink.

Figure 27:
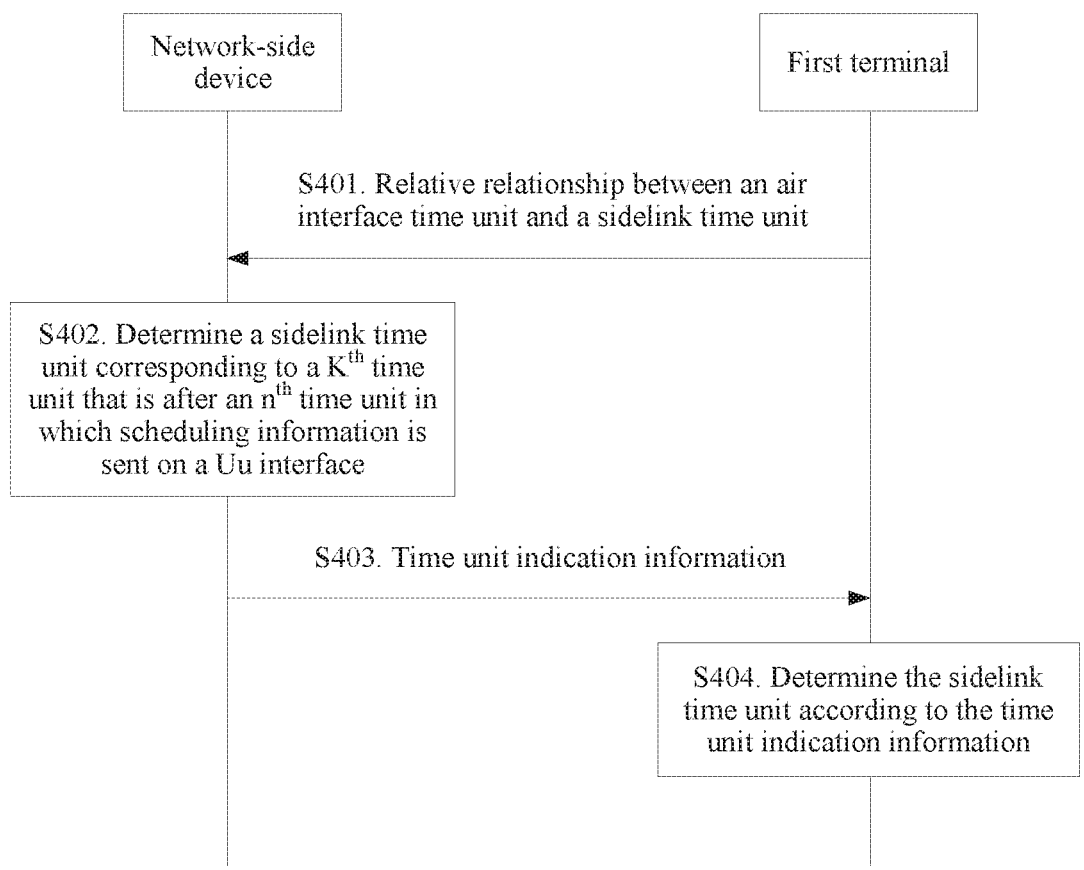
FIG. 27 is another implementation flowchart for determining a sidelink time unit according to an embodiment of the present invention.

In this embodiment of the present invention, to enable the network-side device to better schedule resources on the sidelink, the first terminal may report a relative relationship between the Uu interface time unit and the sidelink time unit; and the network-side device may determine, according to the relative relationship between the Uu interface time unit and the sidelink time unit that is reported by the first terminal, the correspondence between the Uu interface time unit and the sidelink time unit that is indicated by the time unit indication information. As shown in FIG. 27, a specific implementation process includes the following steps.

S401. A first terminal sends a relative relationship between a Uu interface time unit and a sidelink time unit to a network-side device.

In this embodiment of the present invention, the first terminal may send the relative relationship between the Uu interface time unit and the sidelink time unit to the network-side device by using dedicated RRC signaling, MAC layer signaling, or physical layer signaling.

In this embodiment of the present invention, the relative relationship between the Uu interface time unit and the sidelink time unit that is sent by the first terminal to the network-side device may be two sidelink time unit sequence numbers corresponding to the Uu interface time unit, so that the network-side device may determine, according to the time unit sequence numbers, a sidelink time unit corresponding to a $K^{th}$ time unit that is after an $n^{th}$ time unit in which scheduling information is sent on a Uu interface. For example, the first terminal may fixedly report two sidelink time unit sequence numbers corresponding to a time unit whose time unit sequence number is 0 on the Uu interface. As shown in FIG. 23, the time unit whose sequence number is 0 on the Uu interface crosses sidelink time units whose time unit sequence numbers are 3 and 4 on a sidelink, and therefore the first terminal may send the time units whose time unit sequence numbers are 3 and 4 on the sidelink to the network-side device. If the network-side device sends the scheduling information in a time unit whose time unit sequence number is 6 on the Uu interface, it may be determined that a fourth time unit whose time unit sequence number is 0 after the time unit in which the network-side device sends the scheduling information on the Uu interface overlaps sidelink time units whose time unit sequence numbers are 3 and 4 on the sidelink. Further, the network-side device may indicate, by using time unit indication information, a sidelink time unit whose time unit sequence number is 3 or 4.

The relative relationship between the Uu interface time unit and the sidelink time unit that is sent by the first terminal to the network-side device may also be one of two sidelink time unit sequence numbers corresponding to a Uu interface time unit, and the reported time unit sequence number may be a sequence number of a time unit whose time is earlier, or may be a sequence number of a time unit whose time is later. The network-side device may determine the other time unit sequence number by using the obtained time unit sequence number, and further determine, in the foregoing manner, a sidelink time unit that overlaps the Uu interface time unit in which the scheduling information is sent.

In this embodiment of the present invention, the Uu interface time unit sequence number corresponding to the time unit sequence number reported by the first terminal may be fixed or variable, or may be preconfigured, or may be notified by the network-side device to the first terminal by using system information, dedicated RRC signaling, MAC layer signaling, physical layer signaling, or the like.

The relative relationship between the Uu interface time unit and the sidelink time unit that is sent by the first terminal to the network-side device may also be two Uu interface time unit sequence numbers corresponding to a sidelink time unit or one (for example, one whose time is earlier or later) of two time unit sequence numbers, or a sequence number difference between a time unit on the Uu interface and two corresponding sidelink time units on the sidelink or one of two sidelink time units, or may be a sequence number difference between two sidelink time units on the sidelink and a time unit on the Uu interface, or may be a sequence number difference between one of two sidelink time units on the sidelink and a time unit on the Uu interface.

S402. The network-side device determines, according to the relative relationship between the Uu interface time unit and the sidelink time unit that is reported by the first terminal, a sidelink time unit on a sidelink corresponding to a $K^{th}$ time unit that is after an $n^{th}$ time unit in which scheduling information is sent on a Uu interface, and can further determine a correspondence between the Uu interface time unit and the sidelink time unit that is indicated by time unit indication information.

S403. The network-side device sends the time unit indication information, where the time unit indication information is used to indicate the correspondence between the Uu interface time unit and the sidelink time unit, and the sidelink time unit is the sidelink time unit on the sidelink, determined by the network-side device according to the relative relationship between the Uu interface time unit and the sidelink time unit that is reported by the first terminal, and corresponding to the $K^{th}$ time unit that is after the $n^{th}$ time unit in which the scheduling information is sent on the Uu interface.

S404. The first terminal receives the time unit indication information, and determines the sidelink time unit according to the time unit indication information.

In this embodiment of the present invention, the first terminal reports the relative relationship between the Uu interface time unit and the sidelink time unit; the network-side device can determine, according to the relative relationship between the Uu interface time unit and the sidelink time unit that is reported by the first terminal, the sidelink time unit corresponding to the $K^{th}$ time unit that is after the $n^{th}$ time unit in which the scheduling information is sent on the Uu interface, that is, determine the correspondence between the Uu interface time unit and the sidelink time unit, and indicate, by using the time unit indication information, the correspondence between the Uu interface time unit and the sidelink time unit, so that the network-side device can better schedule resources on the sidelink.

What is described above in this embodiment of the present invention is an implementation in which the network-side device sends the time unit indication information to indicate the correspondence between the Uu interface time unit and the sidelink time unit, and a bit specially used for indicating the time unit indication information needs to be set in the scheduling information. In another implementation provided by this embodiment of the present invention, to avoid a disadvantage that the sidelink time unit cannot be determined according to the Uu interface time unit, in this implementation, an implicit rule used to indicate the correspondence between the Uu interface time unit and the sidelink time unit may be preconfigured between the network-side device and the first terminal. When the network-side device and the first terminal determine the $K^{th}$ time unit that is after the $n^{th}$ time unit in which the network-side device sends the scheduling information on the Uu interface, the sidelink time unit corresponding to the $K^{th}$ time unit that is after the $n^{th}$ time unit in which the network-side device sends the scheduling information on the air interface may be determined according to the preconfigured implicit rule. The first terminal determines, according to the implicit rule, the specific sidelink time unit corresponding to the $K^{th}$ time unit that is after the $n^{th}$ time unit on the Uu interface, and uses the determined sidelink time unit as a start time unit of a resource period.

It should be noted that, in this embodiment of the present invention, the correspondence between the Uu interface time unit and the sidelink time unit that is indicated by the implicit rule is the same as the correspondence between the Uu interface time unit and the sidelink time unit that is indicated by using the time unit indication information. For details, refer to the correspondence between the Uu interface time unit and the sidelink time unit that is indicated by using the time unit indication information in the foregoing embodiment. Details are not described again herein.

It should be noted that, in the embodiments of the present invention, "plurality" denotes two or more. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

A person of ordinary skill in the art may understand that all or a part of the steps in each of the foregoing method of the embodiments may be implemented by a program instructing a processor. The foregoing program may be stored in a computer readable storage medium. The storage medium may be a non-transitory medium, such as a random-access memory, read-only memory, a flash memory, a hard disk, a solid state drive, a magnetic tape, a floppy disk, an optical disc, or any combination thereof.

The present invention is described with reference to the flowcharts and block diagrams of the method and device according to the embodiments of the present invention. It should be understood that computer program instructions may be used to implement each process and each block in the flowcharts and the block diagrams and a combination of a process and a block in the flowcharts and the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts or in one or more blocks in the block diagrams.

The foregoing descriptions are merely example implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A communication method, comprising:
determining, by a first terminal, a start time unit of a resource period in a resource, wherein the resource comprises a plurality of resource periods having a same period duration;
transmitting, by the first terminal, communication data in the resource period to a second terminal, wherein the communication data is transmitted in the start time unit and the communication data is retransmitted in another time unit of the resource period;
sending, by the first terminal, transmission sequence number indication information and time domain transmission resource indication information to the second terminal;
wherein the transmission sequence number indication information indicates that currently transmitted communication data is initial transmission or retransmission, and wherein the time domain transmission resource indication information indicates a time domain resource position that is relative to the start time unit and that is of the initial transmission or the retransmission; and
transmitting, by the first terminal, subsequent communication data periodically in following resource periods of the resource according to the start time unit and the period duration to the second terminal.

2. The communication method according to claim 1, further comprise:
determining, by the first terminal, the period duration of the resource period in the resource, wherein the period duration is configured by a network device or preconfigured.

3. The communication method according to claim 1, further comprising:
sending, by the first terminal, resource period indication information to the second terminal, wherein the resource period indication information indicates the period duration of the resource period used by the first terminal.

4. A communication method, comprising:
obtaining, by a second terminal, transmission sequence number indication information and time domain transmission resource indication information from a first terminal, wherein:
the transmission sequence number indication information indicates that a communication data is initial transmission or retransmission, wherein the communication data is transmitted in a start time unit of a resource period and the communication data is retransmitted in another time unit of the resource period; and
the time domain transmission resource indication information indicates a time domain resource position that is relative to the start time unit and that is of the initial transmission or the retransmission;
determining, by the second terminal and according to the transmission sequence number indication information and the time domain transmission resource indication information, the time domain resource position of the initial transmission and the retransmission;
receiving, by the second terminal, resource period indication information from the first terminal, wherein the resource period indication information indicates a period duration of the resource period used by the first terminal; and
receiving, by the second terminal, subsequent communication data periodically in following resource periods having the same period duration according to the start time unit and the period duration from the first terminal.

5. A communications apparatus, applied to a sending terminal, comprising:
at least one processor; and
a non-transitory computer-readable storage medium coupled to the at least one processor and storing programming instructions for execution by the at least one processor, wherein the programming instructions enable the communication apparatus to:
determine a start time unit of a resource period in a resource, wherein the resource comprises a plurality of resource periods having a same period duration;
transmit communication data in the resource period to a receiving terminal that performs direct communication with the sending terminal, wherein communication data is transmitted in the start time unit and the communication data is retransmitted in another time unit of the resource period;
send transmission sequence number indication information and time domain transmission resource indication information to the receiving terminal;
wherein the transmission sequence number indication information indicates that currently transmitted communication data is initial transmission or retransmission, and wherein the time domain transmission resource indication information indicates a time domain resource position that is relative to the start time unit and that is of the initial transmission or the retransmission; and
transmit subsequent communication data periodically in following resource periods of the resource according to the start time unit and the period duration to the receiving terminal.

6. The communications apparatus according to claim 5, wherein the programming instructions further enable the communication apparatus to:
  determine the period duration of the resource period in the resource, wherein the period duration is configured by a network device or preconfigured.

7. The communications apparatus according to claim 5, wherein the programming instructions further enable the communication apparatus to:
  send resource period indication information to the receiving terminal, wherein the resource period indication information indicates the period duration of the resource period used by the sending terminal.

8. A communications apparatus, applied to a receiving terminal, comprising:
  at least one processor; and
  a non-transitory computer-readable storage medium coupled to the at least one processor and storing programming instructions for execution by the at least one processor, wherein the programming instructions enable the communication apparatus to:
    obtain transmission sequence number indication information and time domain transmission resource indication information from a sending terminal that performs device-to-device communication with the receiving terminal, wherein the transmission sequence number indication information indicates that a communication data is initial transmission or retransmission, wherein the communication data is transmitted in a start time unit of a resource period and the communication data is retransmitted in another time unit of the resource period, and wherein the time domain transmission resource indication information indicates a time domain resource position that is relative to the start time unit and that is of the initial transmission or the retransmission;
    determine, according to the transmission sequence number indication information and the time domain transmission resource indication information, the time domain resource position of the initial transmission and the retransmission;
    receive resource period indication information from a first terminal, wherein the resource period indication information indicates a period duration of the resource period used by the first terminal; and
    receive subsequent communication data periodically in following resource periods having the same period duration according to the start time unit and the period duration.

9. A non-transitory computer-readable storage medium comprising instructions which, when executed by a computer, cause the computer to:
  determine a start time unit of a resource period in a resource, wherein the resource comprises a plurality of resource periods having a same period duration;
  transmit communication data in the resource period, wherein communication data is transmitted in the start time unit and the communication data is retransmitted in another time unit of the resource period;
  send transmission sequence number indication information and time domain transmission resource indication information to a receiving terminal that performs direct communication with the computer;
  wherein the transmission sequence number indication information indicates that currently transmitted communication data is initial transmission or retransmission, and wherein the time domain transmission resource indication information indicates a time domain resource position that is relative to the start time unit and that is of the initial transmission or the retransmission; and
  transmit subsequent communication data periodically in following resource periods of the resource according to the start time unit and the period duration.

10. The non-transitory computer-readable storage medium according to claim 9, wherein the instructions cause the computer to:
  determine the period duration of the resource period in the resource, wherein the period duration is configured by a network device or preconfigured.

11. The non-transitory computer-readable storage medium according to claim 9, wherein the instructions cause the computer to:
  send resource period indication information to the receiving terminal, wherein the resource period indication information indicates the period duration of the resource period used by the computer.

12. A non-transitory computer-readable storage medium comprising instructions which, when executed by a computer, cause the computer to:
  obtain transmission sequence number indication information and time domain transmission resource indication information from a sending terminal that performs device-to-device communication with the computer, wherein the transmission sequence number indication information indicates that a communication data is initial transmission or retransmission, wherein the communication data is transmitted in a start time unit of a resource period and the communication data is retransmitted in another time unit of the resource period, and wherein the time domain transmission resource indication information indicates a time domain resource position that is relative to the start time unit and that is of the initial transmission or the retransmission;
  determine, according to the transmission sequence number indication information and the time domain transmission resource indication information, the time domain resource position of the initial transmission and the retransmission;
  receive resource period indication information from the sending terminal, wherein the resource period indication information indicates a period duration of the resource period used by the sending terminal; and
  receive subsequent communication data periodically in following resource periods having the same period duration according to the start time unit and the period duration from the sending terminal.

* * * * *